Nov. 30, 1965    M. SILVERBERG    3,221,302
TRANSDUCER POSITION CONTROL APPARATUS
Filed May 15, 1961    11 Sheets-Sheet 3

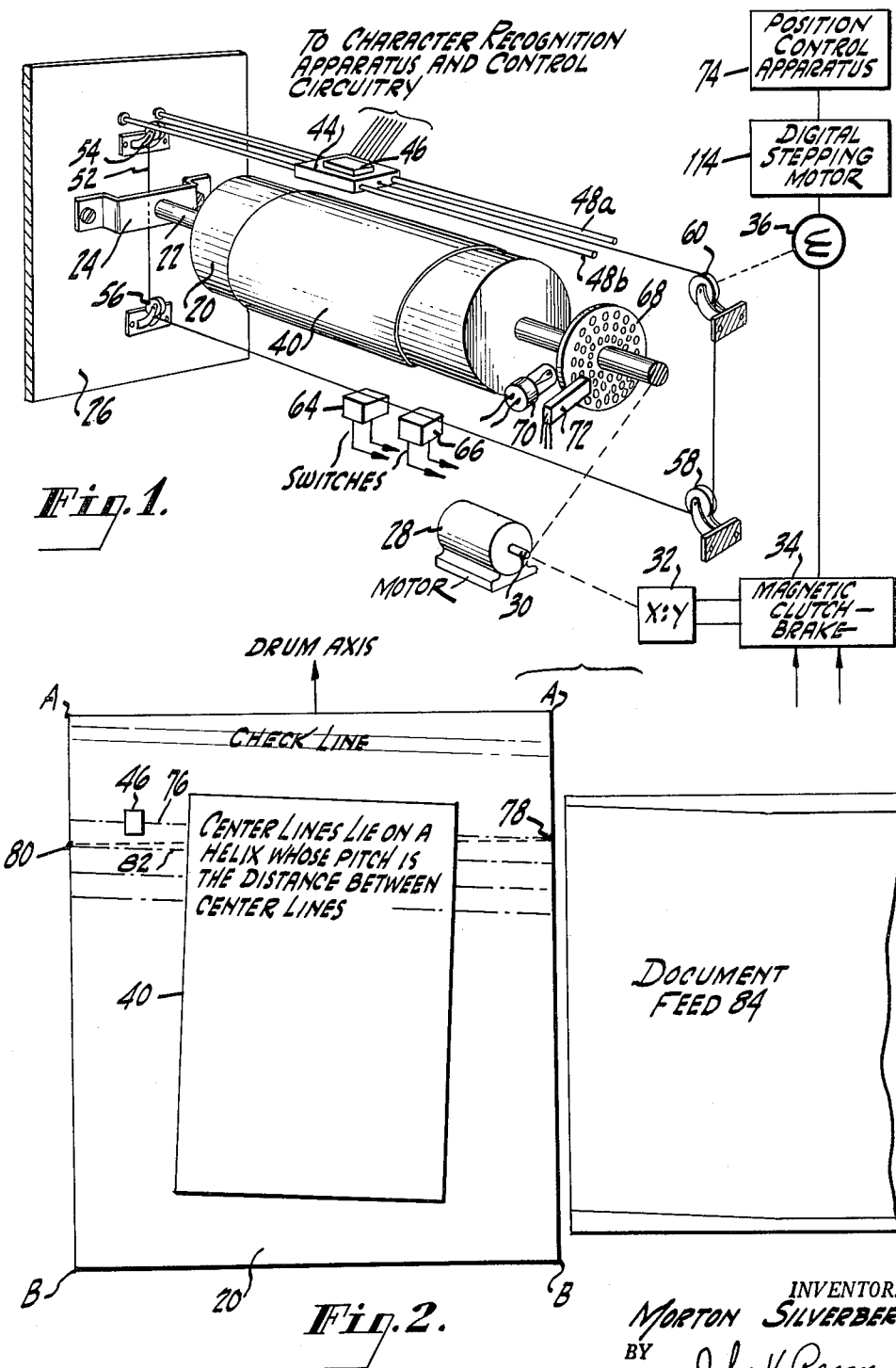

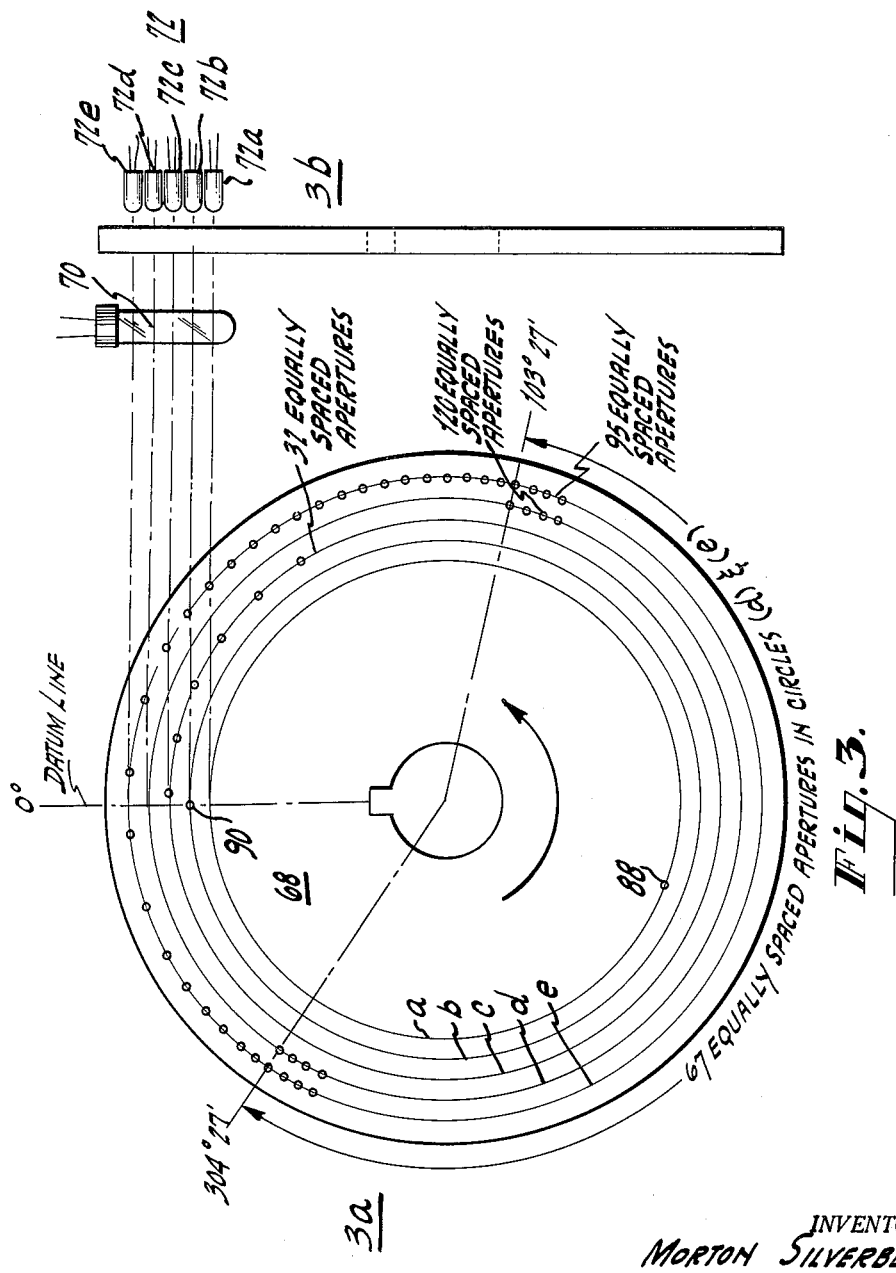

INVENTOR.
MORTON SILVERBERG
BY John V. Regan
Attorney

Nov. 30, 1965 M. SILVERBERG 3,221,302
TRANSDUCER POSITION CONTROL APPARATUS
Filed May 15, 1961 11 Sheets-Sheet 4
Fig.5.
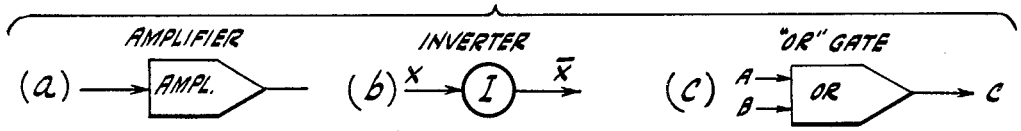
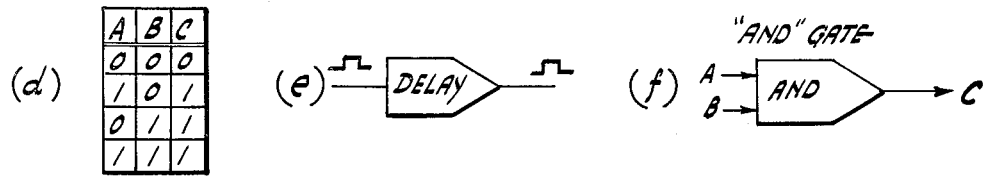
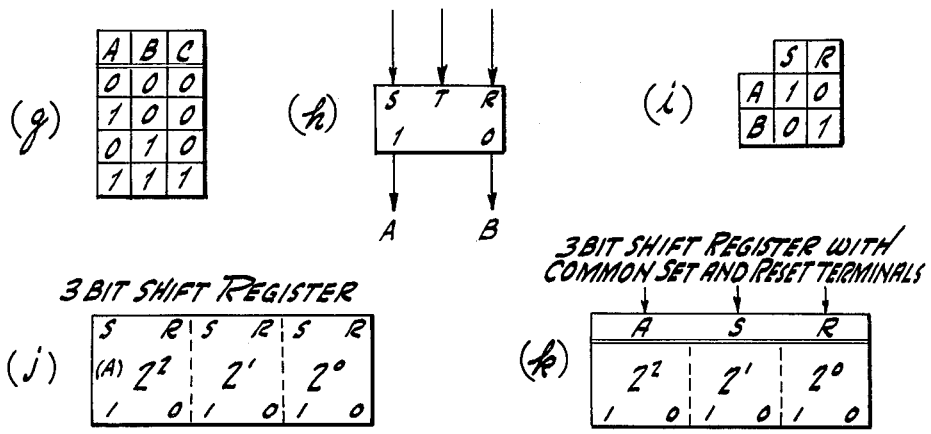
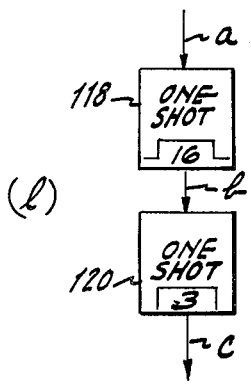
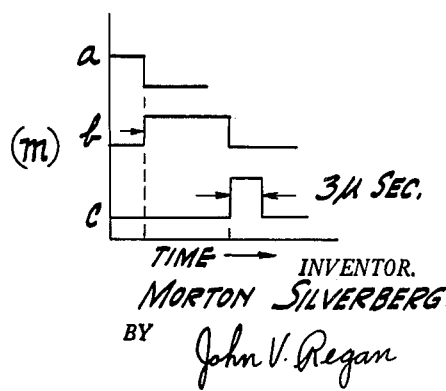
INVENTOR.
MORTON SILVERBERG
BY John V. Regan
Attorney

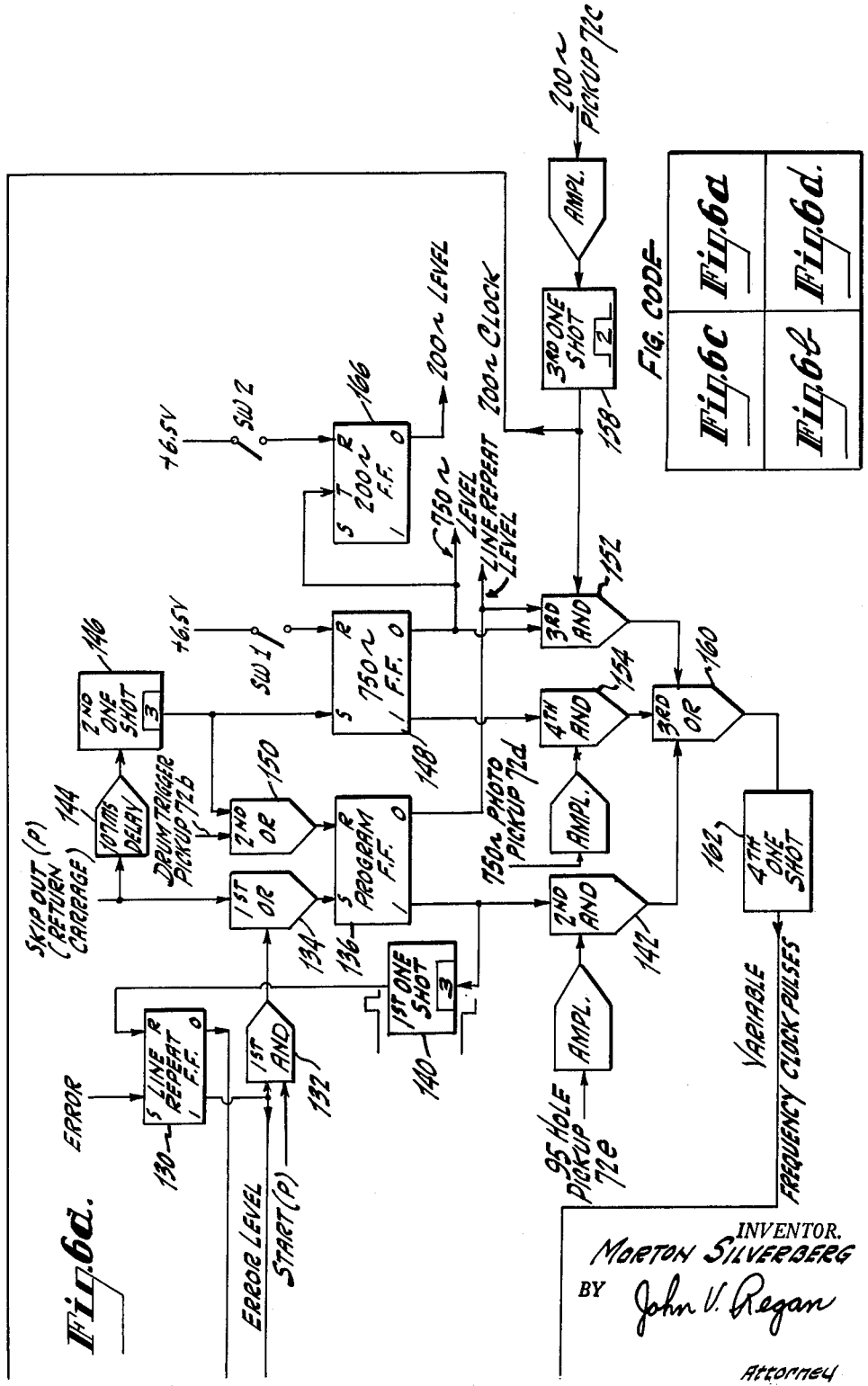

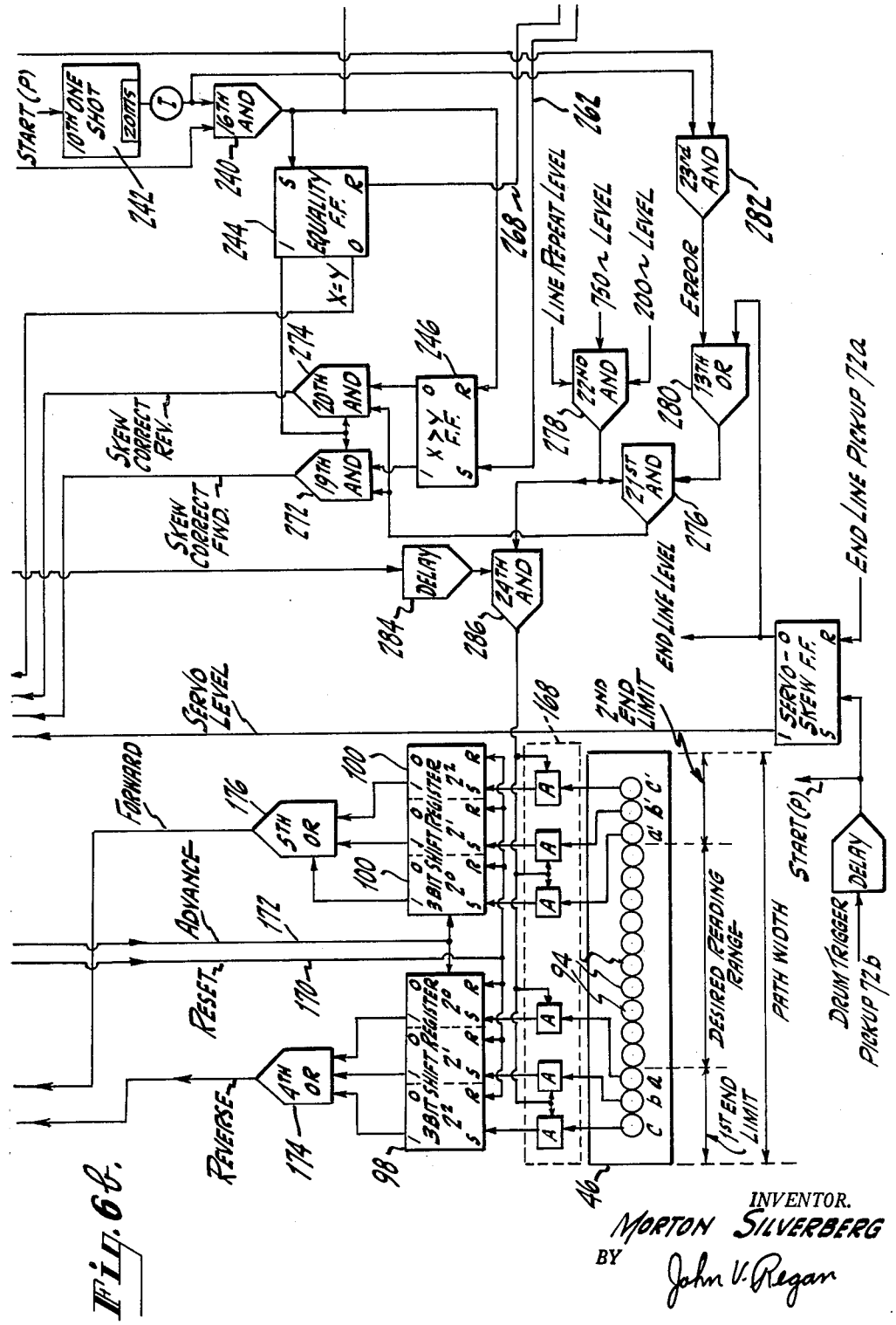

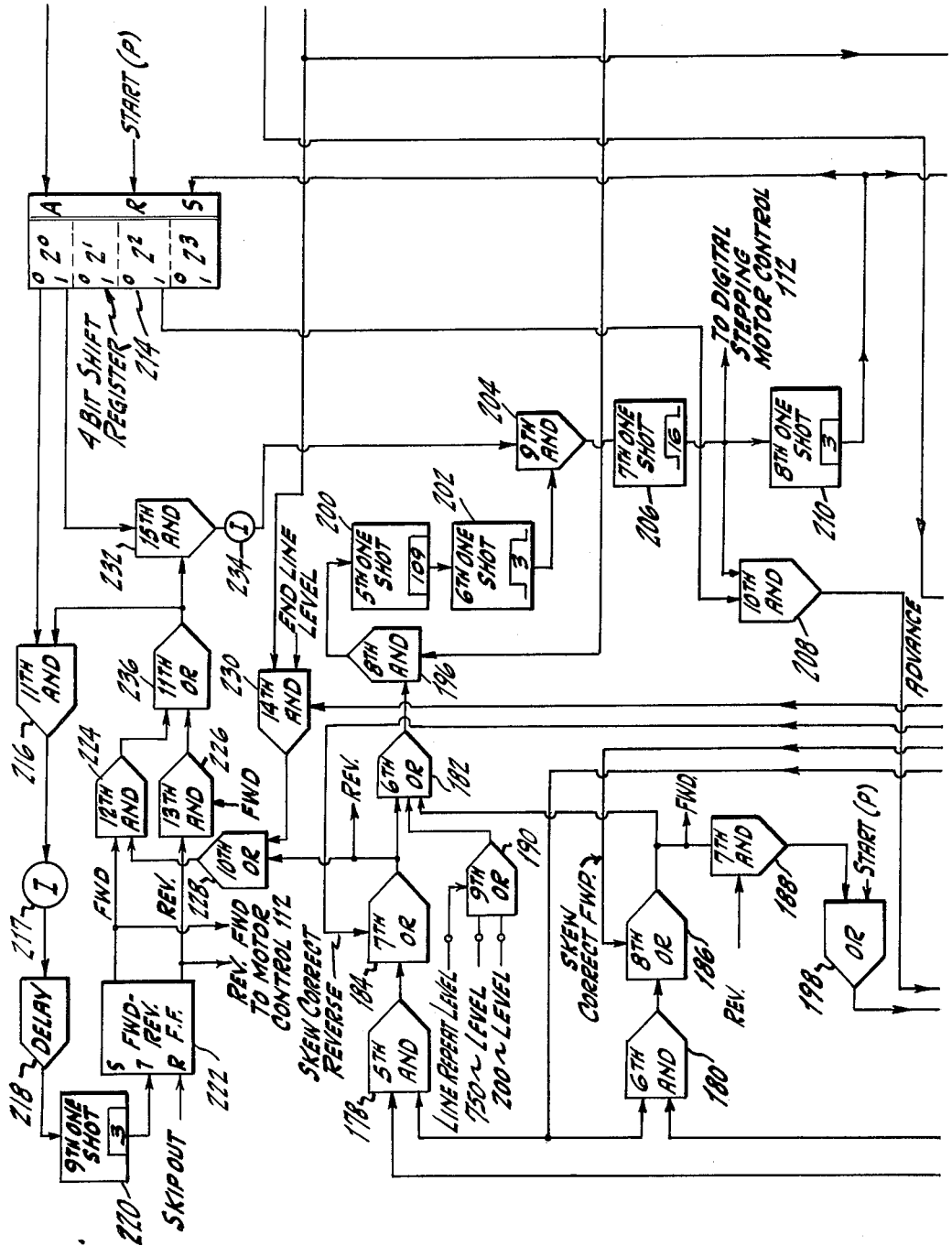

Nov. 30, 1965   M. SILVERBERG   3,221,302
TRANSDUCER POSITION CONTROL APPARATUS
Filed May 15, 1961   11 Sheets-Sheet 8

INVENTOR.
MORTON SILVERBERG
BY John V. Regan
Attorney

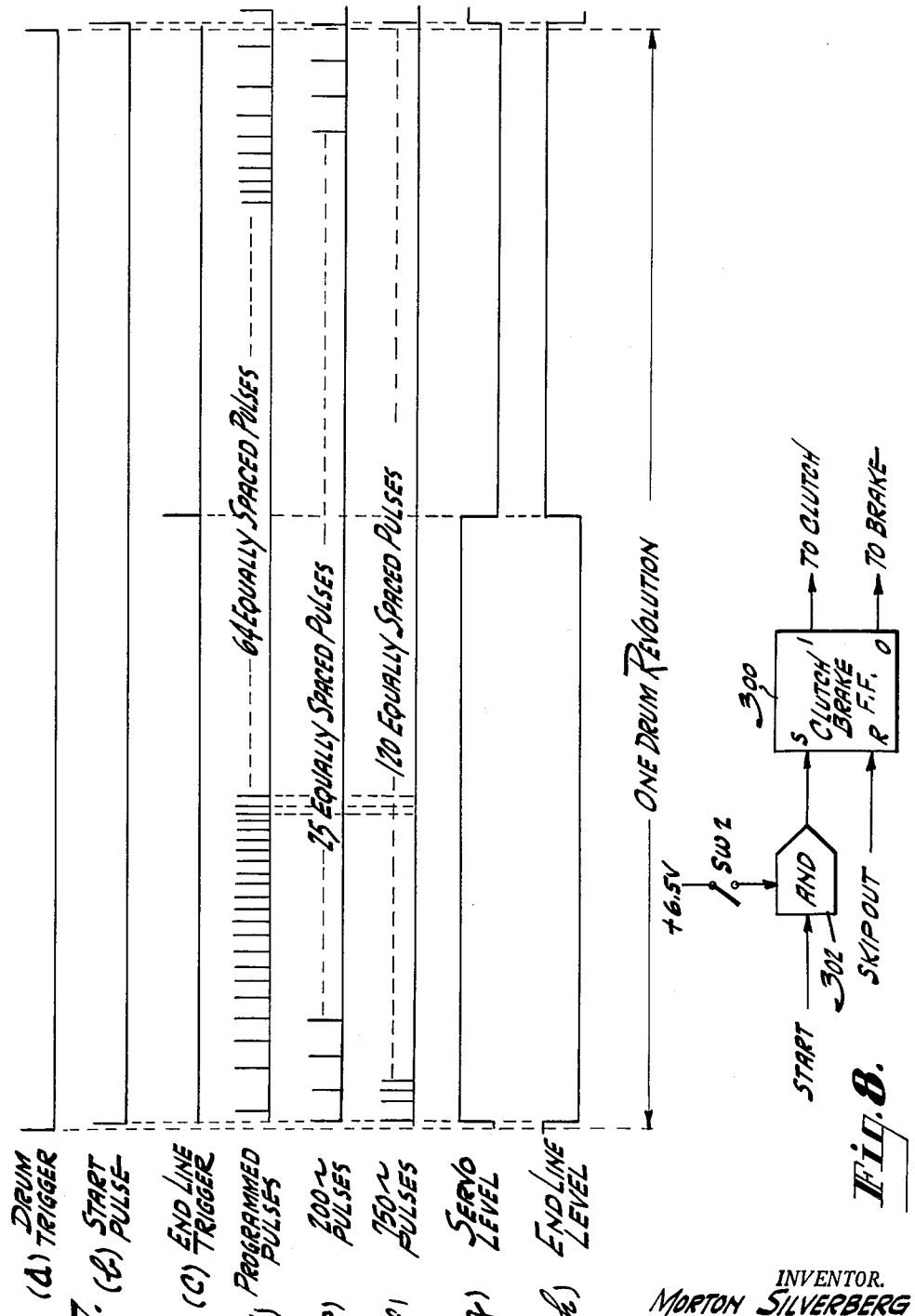

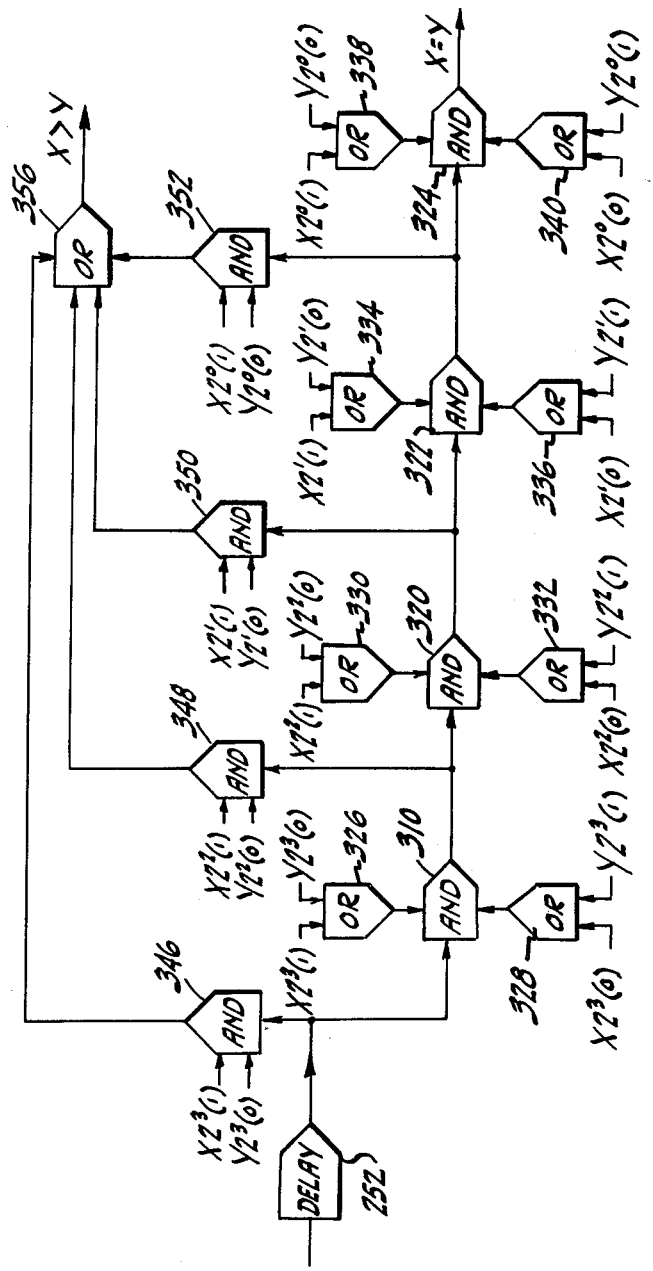

Nov. 30, 1965 M. SILVERBERG 3,221,302
TRANSDUCER POSITION CONTROL APPARATUS
Filed May 15, 1961 11 Sheets-Sheet 11
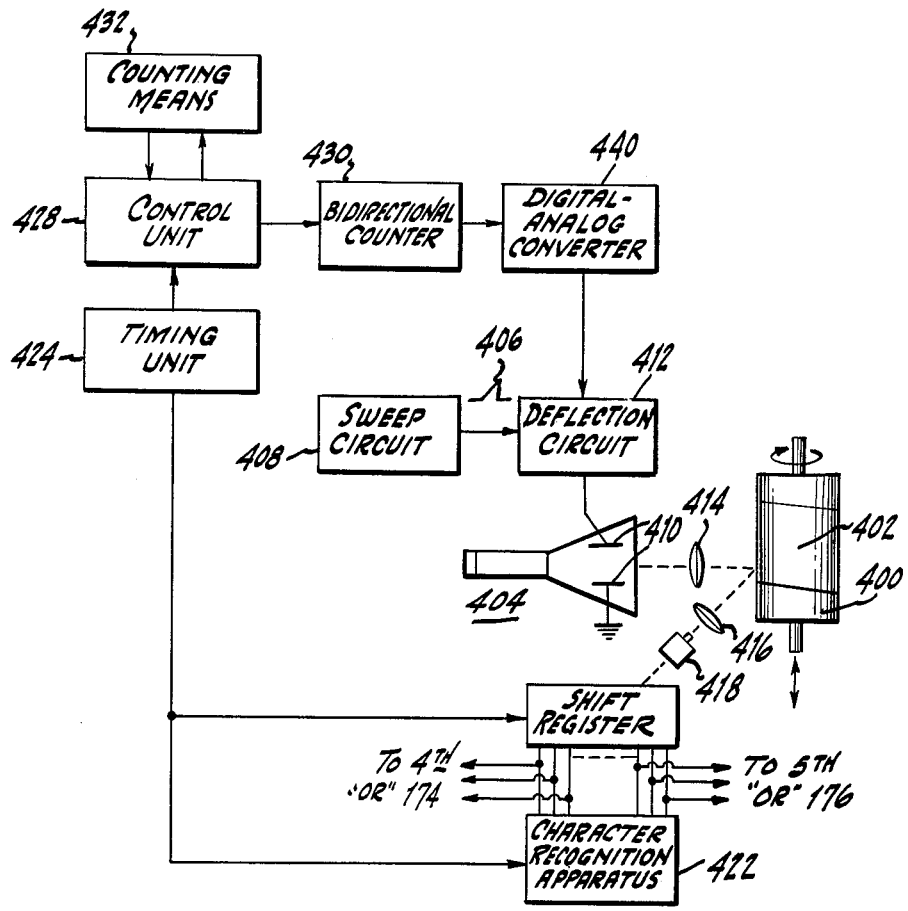
INVENTOR.
MORTON SILVERBERG
BY John V. Regan
Attorney

United States Patent Office 3,221,302
Patented Nov. 30, 1965

3,221,302
TRANSDUCER POSITION CONTROL APPARATUS
Morton Silverberg, Riverton, N.J., assignor to Radio
Corporation of America, a corporation of Delaware
Filed May 15, 1961, Ser. No. 110,126
13 Claims. (Cl. 340—146.3)

This invention relates to novel position control apparatus and, more particularly, to apparatus for controlling the relative position and movement of a transducer.

While not limited thereto, this invention finds special application in an indicia recognition system for controlling the relative position between an information-bearing document and a scanning means or reader transducer. The term "indicia recognition" system includes systems for reading printed characters, graphs, coded perforations, magnetic recordings, and the like. For purposes of illustration, the invention will be described in connection with a system for reading a document having equally spaced rows of characters printed in parallel thereon.

The present invention is particularly well suited for use in a reader system which includes a continuously rotatable drum for transporting a document to be read. The document is fed to the drum with the leading edge of the document skewed with respect to the axis of the drum. The angle of the skew is such that, in the ideal case, the center lines of the rows of characters lie on a helix which as a pitch approximately equal to the spacing between adjacent center lines. This helix is referred to hereinafter as the "standard" helix.

Briefly stated, the present invention is adapted to perform any or all of the following functions, depending upon the particular application:

(1) Locate the first row of characters on the document, or storage medium, and position the transducer to read the first character of the first row.

(2) Control the movement of the transducer relative to the document so that a character being read falls within the central reading range of the transducer as the row of characters is scanned.

(3) Control the movement of the transducer to reread a row if an error is detected in that row.

(4) Move the transducer to the proper position for reading the first character of the next row if no error is detected during the reading of the previous row.

(5) Return the transducer to a "home" position after the last row of information on the document is read.

In the performance of any of the above functions, it will be understood that either the document or the transducer may be moved relative to the other to accomplish the intended function. The phrase "control the movement of the transducer," as it is used hereinabove, has the meaning "control the movement of either one of the transducer and the document relative to the other."

It is among the objects of the invention to provide novel apparatus for performing any and all of the functions aforementioned.

It is another object of the invention to provide position control apparatus of the type described which includes a bidirectional digital stepping motor for positioning either the transducer or the document.

It is still another object of the invention to provide position control apparatus of the type described which includes a bidirectional digital stepping motor and means for producing digital pulses in number corresponding to the desired change in position of the transducer or the document.

It is yet another object of the invention to provide apparatus of the type described which includes variable frequency pulse means and means for selecting a desired frequency of pulses.

Yet another object of the present invention is to provide position control apparatus of the type described including counting means for storing the number and sense of the pulses supplied to the digital stepping motor during the reading of a row of characters.

These and other objects of the invention are accomplished according to the present invention by producing first and second control levels and control pulses in response to information sensed within first and second opposite end regions, respectively, of the transducer reading range. The control pulses and levels are supplied to a bidirectional digital stepping motor control to cause the motor to rotate a predetermined amount for each applied control pulse and in a direction determined by the control level. The digital motor is mechanically coupled to one of the transducer and document transport, whereby the transducer tracks the line of characters being read.

Counting means responsive to the control pulses and control levels effectively store an indication, in digital form, of the numbers of pulses supplied to the digital motor for stepping the motor in one direction and the opposite direction. After a line is read, a number of control pulses equal to the difference in these numbers is supplied to the stepping motor to drive the stepping motor in the direction opposite that in which the motor was moved the greater amount during the reading of the line. This action returns the transducer to the standard helix, whereby the transducer is in position to read the first character of the next row.

In the event that it is desired to repeat the reading of a row of characters, it is necessary to move the transducer in the reverse direction. The first drive means tends to cause the transducer to follow the standard helix during the next revolution of the drum. It is necessary, therefore, to overcome the effect of the first drive means to move the transducer in the reverse direction. A programmed pulse source is provided for this purpose and the number of pulses supplied to the digital motor moves the transducer to the proper position for reading the first character of the row to be reread.

In the accompanying drawing, like reference characters denote like components and:

FIGURE 1 is a view, partially in perspective and partially in block schematic form, of a document reader system illustrating one example of a suitable operating environment for the invention;

FIGURE 2 is a drawing which illustrates the desired position of a document relative to the drum;

FIGURES 3a and 3b are, respectively, front and side elevational views of a timing disk;

FIGURE 5 is a set of symbols used in FIGURES 6, 8 and 9;

Figure 6D:
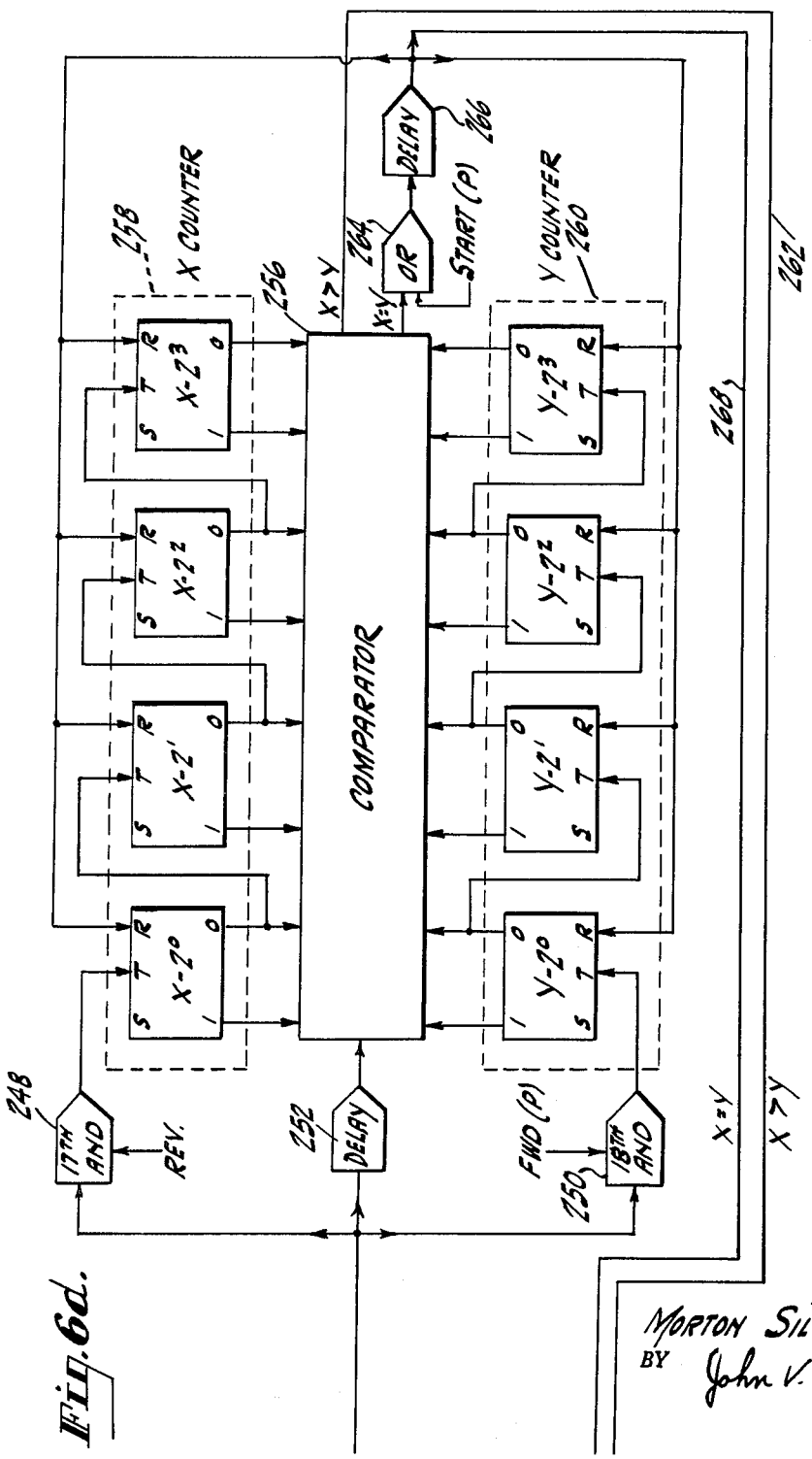

FIGURE 6, comprising FIGURES 6a, 6b, 6c and 6d, is a detailed block diagram of the position control apparatus;

FIGURE 7 is a timing diagram;

FIGURE 8 is a block diagram of a control circuit for the clutch-brake assembly of FIGURE 1;

FIGURE 9 is a block diagram of a comparator suitable for use in the FIGURE 6 apparatus, and;

FIGURE 10 is a block diagram of another reader system for practicing the invention.

DOCUMENT READER SYSTEM

FIGURE 1 is a drawing, partially in perspective, of a document reader system embodying the present invention. Only so much of the system as is necessary for a general understanding of the invention is illustrated in FIGURE 1, for clarity of drawing. Portions of the system are illustrated in detail in other figures. The document transport comprises a drum 20 having a shaft 22. The shaft 22 is supported at the left end thereof by a bracket 24 secured to a rear wall 26. The forward end of the shaft 22 may be similarly supported by a wall and bracket (not shown). A motor 28 is mechanically coupled to the shaft 22, as indicated by the conventional dashed line, and imparts continuous rotary motion to the drum 20. The shaft 30 of the motor 28 also is connected through a gear ratio mechanism 32 to a clutch and brake assembly 34, the output of which is mechanically coupled to a differential gear assembly 36. A document 40 to be read is held against the surface of the drum 20 by means (not shown), which may be, for example, a vacuum arrangement of known type. As will be described hereinafter, the document 40 is fed to the drum 20 with the leading edge of the document 40 skewed at an angle relative to the axis, or shaft 22, of the drum 20.

A reading transducer 46 is mounted on a carriage 44 which is slideably mounted on a pair of shafts 48a, 48b. These shafts 48a, 48b are mounted parallel to the drum axis and are supported at the left end by the wall 26. These shafts 48a, 48b may be supported at the right end, as viewed in the drawing by means such as a forward wall (not shown). The transducer 46 preferably comprises an optically aligned column of photocells or other light-responsive devices, the outputs of all of which are supplied to a character recognition apparatus (not shown). Of course, a different type of transducer is used for reading magnetically recorded data. The outputs of selected end ones of the photocells are supplied to position control circuitry 74, illustrated in detail in FIGURES 4 and 6. A light source (not shown) for illuminating the document 40 is mounted on the carriage 44 and movable therewith. The light-responsive elements of the transducer 46 are optically aligned in a direction parallel to the shafts 48a, 48b and substantially normal to the rows of characters on the document 40. Accordingly, the transducer 46 scans a path of uniform width as the document 40 is rotated relative to the transducer 46. For reasons which will be explained in detail hereinafter, the column of photocells spans a distance greater in extent than the height of the characters recorded on the document 40.

Attached to the carriage 44 at the forward and rear ends thereof is an endless drive belt 52 which is guided by pulleys 54, 56, 58 and 60. The output of the differential 36 is mechanically coupled to the pulley 60 and imparts rotary motion to the pulley 60 for moving the carriage 44 in either direction parallel to the shaft 22. A second input to the differential 36 is mechanically coupled to the output of a bidirectional, digital stepping motor 114. The digital stepping motor 114 is controlled by the position control apparatus 74, to be described hereinafter.

The digital stepping motor 114 may be, for example, a three-phase stepping motor which rotates a predetermined angular distance in response to each applied energizing pulse, preferably without hunting and without accumulated tolerance. Such a motor 114 may be described generally as having three energizing windings A, B and C corresponding to the three phases $\phi_A$, $\phi_B$ and $\phi_C$, respectively. A pulse applied to winding A causes the rotor of the motor 114 to rotate in one direction, for example clockwise, if the last previous pulse was applied to winding C. The rotor rotates in the opposite direction, counterclockwise, when winding A is pulsed if the last previous pulse was applied to winding B.

A bidirectional digital stepping motor suitable for practicing the invention is illustrated and described in the Patent No. 2,774,922, issued on December 18, 1956, to A. G. Thomas. A commercially available bidirectional digital stepping motor suitable for practicing the invention is marketed by the Pace Controls Corporation as model M18.

Two switches 64, 66 are positioned adjacent the belt 52, and each of the switches 64, 66 is energized when the carriage 44 is in a different, predetermined position. The switches 64, 66 may be, for example, photo-pickup devices responsive to light directed through a single aperture, or two different apertures, in the belt 52. The belt 52 may be, for example, a thin strip or band of metallic material.

A timing disk 68, illustrated in detail in FIGURE 3, is fixedly mounted on the shaft 22 of the drum 20. This disk 68 has concentric rings of apertures, to be described. A light source 70 is positioned on one side of the disk 68 and a plurality of photo-sensitive devices 72, one for each of the concentric rings, is positioned on the other side of the disk 68 opposite the light source 70.

DOCUMENT SKEW

FIGURE 2 illustrates the desired position of a document 40 relative to the drum 20. The drum 20 is laid out in planar position for purposes of illustration. That is to say, the drum 20 may be considered to have been cut along a line A–B parallel to its axis, and rolled out flat. Points A and B at the left edge of the drum 20 correspond to the points A and B at the right edge. The document 40 is skewed relative to the drum axis so that the center lines of the rows of characters lie on a helix whose pitch is equal to the distance between the center lines of adjacent rows, in the ideal case. This helix will be referred to as the "standard" helix. The output of the differential 36 of FIGURE 1, in response to the drive motor 28 acting alone, moves the carriage 44 at a speed to cause the center of the transducer 46 to trace out the standard helix on the document 40 as the drum 20 is rotated. The center of the transducer 46 follows or traces the center line 76 when the first row of characters is being read. The center line 76 meets the right edge of the drum 20 at a point 78. This point 78 is the same as the point 80 at the left edge of the drum 20. The point 80 lies on the center line 82 of the second row of characters. Therefore, the center of the transducer 46 follows along the center line 82 of the second row of characters after the first row is read.

A document feed mechanism 84 is provided for feeding documents to the drum 20. The document feed 84, which is not of itself a part of the invention, may be one of several standard types known in the art. Suffice it to say that the document feed 84 is arranged to feed the documents 40 to the drum 20 at the desired angle of skew. The sides 86a, 86b of the document feed 84, for example, are shaped to guide the document 40 to the drum 20 at the desired angle of skew. Due to mechanical tolerances of the system, it is not always possible to position the document 40 on the drum 20 at exactly the desired skew angle. In this case, the center lines of the rows of characters lie at an angle to the standard helix, and means must be provided for causing the transducer 46 to depart from the standard helix so as to track the rows of characters. In general, however, the first character of each row lies on the standard helix and it is necessary, therefore, that the transducer 46 be returned to the standard helix after a row of characters is read. Also, the first row of characters on each document 40 may not always occupy the same position with respect to the top of the document 40, and means must be provided for locating the first row of characters on each document at the beginning of a reading operation. It is the purpose of the present invention to perform these and other functions by way of the digital stepping motor.

A row of characters, called a "check line," may be printed near the top of the drum 20 for the purpose of checking the character recognition apparatus for proper operation. This check line may include all of the characters, symbols, etc., which are to be recognized by the character recognition apparatus. An error detected by the equipment in reading this check line indicates either that the drive for the transducer 46, or the transducer 46 itself, or the character recognition circuitry is not functioning properly.

TIMING DISK 68

FIGURE 3a is a front view of the timing disk 68 of FIGURE 1, and FIGURE 3b is a side view of the timing disk. The disk 68 has five concentric rings of apertures, the ring of smallest radius being designated by the reference character *a* and the ring of largest radius being designated by the reference character *e*. The smallest ring *a* has a single aperture 88 from which is derived an "end line" trigger signal. The ring *b* also has a single aperture 90 from which is derived a "drum trigger" signal. Documents 40 are fed to the drum 20 in such timed relation to the rotation of the drum 20 that the "drum trigger" signal and "end line trigger" signal occur slightly before the first character of a row is adjacent the transducer 46 and after the last character of a row has passed the transducer 46, respectively.

Ring *c* has 32 equally spaced apertures for generating signals at the rate of 200 pulses per second when the drum revolves at a speed of 375 revolutions per minute. Circle *d* has 120 equally spaced apertures for generating timing signals at the rate of 750 pulses per second at the drum speed aforementioned. Circle *e* has 95 "programmed" apertures. The spacing of the apertures in circle *e* is programmed to provide a pulse frequency of approximately 200 pulses per second in the vicinity of the datum line, which is an imaginary radial line passing through the drum trigger aperture 90, and increasing in frequency until the rate of 750 pulses per second is reached at 103°27′ clockwise of the datum line. The frequency is constant at 750 pulses per second from 103°27′ to 304°27′ and then decreases as the datum line is approached.

A light source 70 is positioned on one side of the disk 68. A plurality of photo-pickup devices 72, one for each circle of apertures, is positioned on the opposite side of the disk 68 in alignment with the light source 70. The devices 72a and 72b generate pulses whenever the apertures 88 and 90, respectively, pass between the light source 70 and the pickup devices 72a, 72b. The pickup device 72c generates pulses at the rate of approximately 200 cycles per second. The device 72d generates pulses at approximately 750 pulses per second, and the pickup device 72e generates pulses at the programmed rate described above.

The use of the timing pulses generated by the devices 72a . . . 72e will be clear from a detailed description of FIGURE 6a. It will be helpful at this point, however, to discuss the programmed pulse source. It was mentioned previously that the drive motor 28 (FIGURE 1) imparts motion to the carriage 44 through the differential 36 to cause the center of the transducer 46 to trace out a standard helix. The transducer 46, therefore, normally moves parallel to the drum shaft 22 a distance equal to the pitch of the standard helix during each complete drum 20 revolution. If an error is detected during the reading of a row of characters, it is necessary to return the transducer 46 to a position adjacent the first character of that row during the next drum revolution.

For example, assume that an error is detected during the reading of the first row of characters. The transducer follows the standard helix and is in the position to read the second row of characters during the next revolution of the drum 20. Normally, the transducer 46 is in position to read the first character of the third row at the completion of the drum revolution last-mentioned. It is desired, however, that the transducer 46 then be in position to reread the first row of characters. In order to accomplish this, it is necessary that the transducer 46 be moved in the reverse direction a distance equal to twice the pitch of the standard helix during the drum 20 revolution last mentioned.

The bidirectional digital stepping motor 114 is employed to reposition the transducer 46 and carriage 44. In one particular system, a total of 95 pulses was required to be supplied to the stepping motor 114 to properly position the transducer 46 for rereading a row of characters. Circle *e* on the disk 68 has 95 apertures for accomplishing this purpose, and the pulses are generated starting from the first aperture clockwise from the datum line. In general, a digital stepping motor does not respond to successive high frequency pulses from a start position. It is necessary that the motor be accelerated gradually. The apertures in the vicinity of the datum line are widely spaced, relatively speaking, corresponding to approximately 200 pulses per second. The stepping motor can respond from a rest position to pulses of this frequency. The spacing between apertures on circle *e* decreases steadily in the range from approximately 0° to approximately 103° in the clockwise direction, whereby the stepping motor is accelerated gradually as the pulses increase from approximately 200 pulses per second to approximately 750 pulses per second. In the range from approximately 304° to the datum line, in the clockwise direction, the spacing between apertures on circle *e* increases gradually so as to decelerate the digital stepping motor 114.

GENERAL DESCRIPTION OF THE POSITION CONTROL APPARATUS

Figure 4:
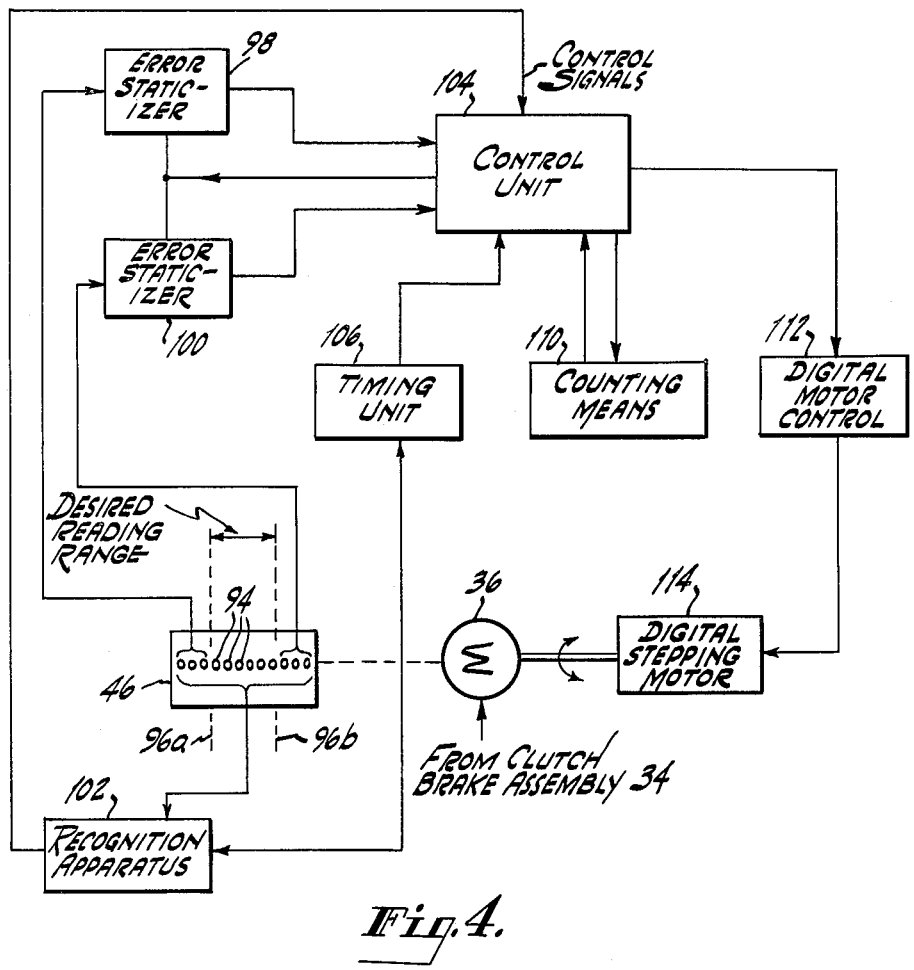
FIGURE 4 is a simplified block diagram of the position control apparatus.

FIGURE 4 is a simplified block diagram of the position control apparatus according to the present invention. The transducer 46, in the lower left-hand corner of the drawing, is illustrated as comprising a column of photocells 94, or other light-responsive devices. As mentioned previously, the central photocell of this group traces out the standard helix when the paper is skewed at the proper angle on the drum 20. The line of photocells 94 traces, or scans, a path of uniform width as the drum 20 is rotated. The width of this path is determined by the distance spanned by the line of photocells and is greater than the height of the characters to be read. It is desired that the transducer 46 be controlled to move relative to the drum 20 and document 40 so that the character being read falls within the dashed lines 96a, 96b.

The three photocells 94 outside each of the dashed lines 96a, 96b are connected to first and second error staticizers 98, 100 which may be, for example, three-bit shift registers. The outputs of all of the photocells 94 are supplied to a character recognition apparatus, indicated by the block 102. The outputs of the staticizers 98, 100 are applied to first and second inputs of a control unit 104, which, in turn, supplies control signals to the staticizers 98, 100. These control signals are used either to reset the staticizer 98, 100 or to shift the information stored therein.

A timing unit 106, which may include the timing disk 68 described previously, supplies timing signals to the control unit 104 and also supplies timing signals to, and receives control signals from, the character recognition apparatus 102. A counting means 110 receives pulses and control levels from the control unit 104 in response to the timing signals from the unit 106 and the outputs from the staticizer 98, 100. The control unit 104 also supplies pulses and control levels of one sense or the opposite sense to a digital motor control unit 112. The digital control unit 112 responds to the control pulses and levels by supplying control signals to the digital stepping motor 114 to rotate the motor 114 in the desired direction. The control levels determine the direction in which the digital motor 114 rotates in response to a control pulse. The motor 114 rotates a predetermined amount in response to each control pulse, and the output of the motor 114 is supplied by the way of the differential 36 to the carriage 44 on which the transducer 46 is mounted. A suitable digital motor control 112 for practicing the invention, and which performs according to the above description, is illustrated and described in my copending application (now Patent No. 3,147,387, issued September 1, 1964), Serial No. 109,975 for Electrical Circuits, filed concurrently herewith and assigned to the same assignee as the present invention.

It is the purpose of the counting means 110 to count the number of control pulses tending to rotate the motor 114 in one direction and the opposite direction during the reading of a row of information. If the number of pulses tending to rotate the motor 114 in one direction is greater than the number of control pulses tending to rotate the motor 114 in the opposite direction, which means that the transducer 46 is displaced from the standard helix after reading a line of characters, it is necessary to move the transducer 46 back to the standard helix before the next row of characters is read. The timing unit 106 supplies an "end of line" trigger signal to the control unit 104 at the end of a line of characters. This signal is derived from the aperture in row $a$ of the disk 68. The control unit 104 responds to this pulse and to the output of the counting means 110 by supplying the proper number of control pulses to the digital motor control 112 to move the transducer 46 to the standard helix. By way of example, assume that ten control pulses were supplied to the motor control 112 to rotate the motor 114 in a clockwise direction and that six pulses were supplied to the motor control 112 to rotate the motor 114 in the counterclockwise direction. In response to the "end line" trigger signal, the control unit 104 supplies four pulses to the motor control unit 112 together with a control level for moving the motor 114 four steps in the counterclockwise direction. This latter operation may be difined as a "skew correct" operation. The operation of causing the transducer 46 to track the row of characters being read may be defined as a "servo operation."

In the event that it becomes necessary to reread a row of characters, an error signal is sent from the recognition apparatus 102 to the timing unit 106. The timing unit 106 then supplies the 95 programmed pulses to the digital motor control 112 by way of the control unit 104. The row repeat operation also may be used for locating the first character of the first row of information as follows. The transducer 46 is moved from a "home" position, at the left end of the drum 20 (FIGURE 1), under the control of the motor 28. The transducer 46 follows the standard helix at this time since no information is being read by the transducer 46 and there is, therefore, no servo motor effect. If the first character of the first row does not fall fully within the reading range of the transducer 46, the recognition apparatus 102 generates an error signal directing the apparatus to reread the first line. As will be described more fully hereinafter, the control unit 104 generates control pulses in response to an output from either error staticizer 98, 100 to cause the digital motor 114 to move the transducer 46 into reading position. The counting means 110 is inhibited during the reading of the first few characters of each row so that no skew correction takes place at the end of a line in response to servoing during the reading of the first few characters. In the worse case condition, several passes on the first row of characters may be necessary to position the transducer 46 to read the first character of the first row. Once the transducer 46 is in position to read the entire first character, the line repeat operation is discontinued and normal reading operation commences.

The recognition apparatus 102 detects the end of the last row of characters on a document 40 by sensing that no information is received for a predetermined period of time. The recognition apparatus 102 then sends a control signal to the timing unit 106 and the control unit 104. The timing unit 106, in turn, supplies pulses to the digital motor control unit 112 by way of the control unit 104 to cause the digital motor 114 to return the transducer 46 to the "home" position. As will be described more fully hereinafter, the brake is engaged at this time so that only the digital motor 114 drives the transducer 46.

DESCRIPTION OF SYMBOLS USED IN THE DRAWING

Certain symbols and components used in the detailed system drawing of FIGURE 6 are illustrated in FIGURE 5 and will now be described. FIGURE 5a is the symbol used to represent a pulse amplifier. A suitable amplifier may be, for example, a threshold gate which is biased slightly below the threshold, and may take the form of an "or" gate to be described.

FIGURE 5b is the symbol for an inverter circuit. An inverter may be defined as a circuit which performs the Boolean function of complementing. In more general terms, the output is $\overline{X}$, meaning "not X," when the input is X, and the output is X when the input is $\overline{X}$.

The symbol for an "or" gate is illustrated in FIGURE 5c. An "or" gate may be defined as a circuit which has two or more input lines and one output line, and which has the property that whenever a pulse or level of a given sense or polarity is present on any of the input lines, a pulse or level of the same polarity or sense is present on the output line. The pulse or level of given sense in the present application corresponds to a binary "one" bit. A "truth" table for an "or" gate of the type described is given in FIGURE 5d. A "one" output and a "zero" output may represent "high" and "low" voltages, respectively.

FIGURE 5e is the symbol used to represent a delay means. The delay means may be, for example, a lumped constant RC network or a one-shot multivibrator, in either event producing an output pulse of the same polarity as the input pulse, but delayed in point of time. The output pulse need not necessarily have the same width as the input pulse, depending upon the particular application of the device.

The symbol used in the drawing for an "and" gate is illustrated in FIGURE 5f, and a "truth" table for such a gate is given in FIGURE 5g. An "and" gate may be defined as a circuit with two or more input lines and one output line, which has the property that a pulse or level of given sense or polarity is present on the output line if, and only if, all of the input lines receive pulses or levels, respectively, of the given sense. In the present case, a pulse or a level of the given sense aforementioned corresponds to a binary "one."

The symbol for a bistable multivibrator or flip-flop is illustrated in FIGURE 5h. A flip-flop is a circuit which has two stable states, two inputs (S) and (R), and two corresponding outputs (1) and (0), respectively. The flip-flops may be set by applying a positive pulse at the (S) input terminal and reset by a positive pulse applied at the (R) input terminal. The (1) output is high, corresponding to a binary "one" and the (0) output is low, corresponding to a binary "zero," when the flip-flop is in the set state. The outputs change sense when the flip-flop is switched to the reset state. The outputs of the flip-flop for these two operating conditions are given in the table of FIGURE 5i.

The flip-flop also may have a trigger (T) input terminal and means for steering input pulses applied at this terminal (T) to trigger the flip-flop from its present operating state to the other operating state. For example, if the flip-flop originally is in the set state, the first pulse of positive polarity applied at the trigger (T) terminal switches the flip-flop to the reset state. The next positive trigger pulse switches the flip-flop back to the set state, etc. Several triggerable flip-flop stages may be cascaded, in known fashion, to provide a binary counter.

The symbol for a three-bit shift register is illustrated in FIGURE 5j. Each of the stages of the shift register has separate set (S) and reset (R) input *terminals* and corresponding (1) and (0) output terminals, respectively.

The register also has an advance input terminal (A) to which pulses are applied for advancing the information in the shift register one stage for each applied advance pulse. The symbol for a three-bit shift register having common set (S) and common reset (R) input terminals is illustrated in FIGURE 5k. In this shift register, all of the set (S) terminals are connected together, and all of the reset (R) terminals are connected together.

The symbol used in the drawing to represent a pair of one-shot, or monostable, multivibrators connected in cascade is illustrated in FIGURE 5l. A trigger signal (a) is applied at the input of the first one-shot 118. The one-shot is triggered by a negative-going level or signal and, in response to the trigger, provides a positive-going output pulse having a width in microseconds equal to the number within the box 118. In this example, the pulse width is 16 microseconds, as illustrated in FIGURE 5m. The output (b) drops in the negative direction at the termination of the 16 microsecond pulse, and the negative-going lagging edge triggers the second one-shot 120. The second one-shot 120 provides a positive-going pulse (c) of three microsecond duration. One-shot multivibrators are used either singly or in pairs in the drawing for delay purposes and for pulse shaping.

DETAILED DESCRIPTION OF THE POSITION CONTROL APPARATUS

A detailed block diagram of a position control apparatus which may be used in the arrangement of FIGURE 1 is illustrated in FIGURES 6a, 6b, 6c and 6d. The manner in which these figures may be positioned with respect to each other to form a single diagram of the apparatus is illustrated at the lower right in FIGURE 6a. The apparatus of FIGURE 6a is roughly equivalent to the timing unit 106 of FIGURE 4, and its main function is to supply the digital pulses of controlled frequency which are fed to the motor control unit 112. Two control signals are supplied to the FIGURE 6a apparatus from the character recognition circuitry. The first such control signal is an "error" signal applied to the set terminal of a line repeat flip-flop 130. When the character read by the transducer is not recognized by the character recognition circuitry, this signal, as will be described hereinafter, initiates the line repeat operation. The second control signal is termed a "skip-out" signal and initiates the operation for returning the carriage 44 to its "home" position.

The (1) output of the line repeat flip-flop 130 and a "Start" signal are applied to different inputs of a first "and" gate 132, the output of which is connected to a first "or" gate 134. The first "or" gate 134 receives a second input, the skipout signal, from the character recognition circuitry. The output of the first "or" gate 134 sets a program flip-flop 136. The (1) output of this flip-flop 136 resets the line repeat flip-flop 130 by way of a one-shot 140, and also is applied to one input of a second "and" gate 142. The other input to this "and" gate 142 is the amplified, programmed output of the photo-pickup unit 72e (FIGURE 3).

The "skip-out" signal is delayed by a device 144 for 107 milliseconds and then applied to the input of a second one-shot 146. The output of the one-shot 146 sets a 750 cycle flip-flop 148 directly, and resets the program flip-flop 136 by way of a second "or" gate 150. The other input to the second "or" gate 150 is the drum trigger signal output of the photo-responsive element 72b (FIGURE 3). The (0) output of the program flip-flop 136 is termed the "line repeat level" and is used to perform various control functions elsewhere in FIGURE 6. The (0) outputs of the program flip-flop 136 and the 750 cycle flip-flop 148 are connected to different inputs of a third "and" gate 152. The (1) output of the 750 cycle flip-flop 148 is applied to a fourth "and" gate 154 together with the amplified output of the photo-responsive device 72d (FIGURE 3).

The amplified output of the photo-responsive device 72c (FIGURE 3) triggers a third one-shot 158. The output of this one-shot 158, which is a continuous train of positive-going pulses having a frequency of 200 pulses per second, is applied to a third input of the third "and" gate 152 and also is applied to the advance (A) input terminal of a four-bit shift register 214 in FIGURE 6c. The outputs of the second, third and fourth "and" gates 142, 152, 154, respectively, are connected to different inputs of a third "or" gate 160, the output of which is connected to a fourth one-shot 162. The frequency of the pulse output of this one-shot 162 is either 200 or 750 pulses per second when either the third "and" gate 152 or the fourth "and" gate 154, respectively, is activated. The output of the fourth one-shot 162 has a programmed frequency when the second "and" gate 142 is activated.

The reset input terminal of the 750 cycle flip-flop 48 is connected by way of the SW1 switch 64 to a source of positive voltage, indicated as +6.5 v. The SW1 switch, illustrated in FIGURE 1 and described previously, is energized as the carriage 44 neards its "home" position. The (0) output of this flip-flop 148 is applied as a control level to other parts of FIGURE 6 and also is applied to the trigger (T) terminal of a 200 cycle flip-flop 166. The reset (R) input terminal of the latter flip-flop 166 is connected by way of the SW2 switch 66 to +6.5 volts. The (0) output of the 200 cycle flip-flop 166 is a control level, designated "200 cycle level" and supplied to circuits to be described. The SW2 switch 66 is illustrated in FIGURE 1 and, as described previously, is energized when the carriage 44 reaches its "home" position.

The operation of the timing unit of FIGURE 6a may be summarized briefly as follows. The output of the fourth one-shot 162 is 200 pulses per second, except during either a line repeat or a carriage return operation. During the line repeat operation, initiated by an "error" signal, the output of the fourth one-shot 162 consists of 95 pulses programmed in frequency. The carriage return operation is initiated by the "skip-out" signal from the character recognition apparatus. The output of the fourth one-shot 162 increases in frequency to 750 pulses per second during the first 107 milliseconds following the "skip-out" signal, and remains at this frequency until the SW1 switch is energized. The frequency of the output pulses then drops to 200 pulses per second. The SW2 switch terminates the carriage return.

The transducer 46 and error staticizers 98 and 100 (FIGURE 4) are shown in detail at the left of FIGURE 6b. The transducer 46 is illustrated as comprising a plurality of aligned photocells 94. These photocells 94 need not actually be in physical alignment, it is only necessary that they be optically aligned so as to sense information along a line substantially normal to a row of characters. The reading range of the transducer 46 may be considered as comprising three zones: (a) a central zone, (b) a first end limit, and (c) a second end limit. It is desirable for tracking purposes that the character being read lie within the central zone. If a portion of the character being read is sensed by any of the photocells 94 in either of the end limits, the apparatus functions to move the transducer 46 parallel to the axis of the drum 20 in a direction toward the end limit in which the information is sensed. The following example will clarify this point. Assume that the left end of the transducer 46, as viewed in the drawing, faces the top of the document being read and that the second end limit faces the bottom of the document. If the center of the transducer 46 is not aligned with the center line of the row of information being read, the photocells 94a, 94b, 94c in the first end limit may sense information if the center of the transducer 46 is below the center line of the row of characters. It is desirable in this case that the position control system move the transducer 46 to the left, as viewed in the drawing, relative to the character so that the character fall within the central or desired reading unit. In like manner, if the center of the transducer 46 is above the center line of the row of characters, information may be sensed by ones of the three photocells 94a', 94b', 94c', in the second end limit. The system then functions to move the transducer 46 to the right, as viewed in the drawing.

The outputs of the three photocells 94a, 94b, 94c in the first end limit are connected to different set (S) input terminals of the stages in a three-bit shift register 98 by way of separate "and" gates 168. The outputs of the three photocells 94a', 94b', 94c' in the second end limit are connected to different set (S) input terminals of the three stages in the second three-bit shift register 100 by way of the "and" gates 168. (The outputs of all of the photocells 94 in the transducer 46 are supplied to the character recognition apparatus.) The reset (R) input terminals of all of the stages in the registers 98 and 100 are connected in common to a line 170. The advance (A) terminals of the registers 98, 100 are connected to a common advance line 172. The (1) outputs of all of the stages in the shift register 98 are connected to different inputs of a fourth "or" gate 174, and the (1) outputs of all of the stages in the other register 100 are connected to different inputs of a fifth "or" gate 176.

The outputs of the fourth and fifth "or" gates 174, 176 are connected to the inputs of a fifth "and" gate 178 (FIGURE 6c) and a sixth "and" gate 180, respectively. The output of the fifth "and" gate 178 is applied to the input of a three-input sixth "or" gate 182 by way of a seventh "or" gate 184. The output of the sixth "and" gate 180 is applied to another input of the sixth "or" gate 182 by way of an eighth "or" gate 186. The third input to the sixth "or" gate 182 is the output of a ninth "or" gate 190 which receives at its inputs the inverted line repeat, 750 cycle and 200 cycle levels (from FIGURE 6a). The output of the ninth "or" gate 190 is low except during a "skip-out" or carriage return operation.

It is desirable to reset the registers 98 and 100 at the start of each row of characters. It is also necessary to reset these registers 98, 100 whenever both registers contain information, inasmuch as an indeterminate condition then exists. The output (REV) of the seventh "or" gate 184 and the output of the eighth "or" gate 186 are connected to different inputs of a seventh "and" gate 188. The output of this seventh "and" gate 188 goes high when information is present simultaneously in both registers, 98, 100, and is applied through an "or" gate 198 to the reset line 170 of the registers 98, 100. A second input to this "or" gate 198 is the "start" signal which is generated before the first character of each row of characters.

The circuitry for generating the "start" signal and other control signals is illustrated at the bottom of FIGURE 6b. The "drum trigger" output of the photo-responsive device 72b (FIGURE 3) is fed through a delay device 192 to the set terminal of a servo-skew flip-flop 194. The output of this delay device 192 is the "start" signal aforementioned. The servo-skew flip-flop 194 is reset by the output of the photo-responsive device 72a at the end of a row of characters. The (1) output of the servo-skew flip-flop 194 is designated "servo level," and is used to enable the fifth and sixth "and" gates 178, 180 during a read operation. The (0) output of this flip-flop is a control level, designated "end line level."

The output of the sixth "or" gate 182 is applied to one input of an eighth "and" gate 196. The other input to this "and" gate 196 is the variable frequency clock output of the fourth one-shot 162 of FIGURE 6a. Whenever the sixth "or" gate 182 is activated, the eighth "and" gate 196 passes the clock pulses to a fifth one-shot multivibrator 200. This one-shot 200 provides positive pulses of 109 microsecond duration in response to each applied trigger pulse. The negative-going, lagging, edge of each of these output pulses triggers a sixth one-shot multivibrator 202, which provides positive output pulses of three microsecond duration to a ninth "and" gate 204. The combination of the fifth and sixth one-shots 200 and 202 serves as a delay and pulse shaping network. The output of the ninth "and" gate 204 triggers a seventh one-shot 206, the pulse output of which is applied to the digital stepping motor control unit 12 of FIGURE 4. The output of the seventh one-shot 206 also is applied to a tenth "and" gate 208 in the advance line 172 of the error staticizer registers 98, 100 (FIGURE 6b), and to the input of an eighth one-shot 210, the output of which is applied: (1) to all of the set (S) terminals of a four-bit shift register 214, and (2) to a sixteenth "and" gate 240 (FIGURE 6b).

The (1) output terminal of the $2^2$ stage of the four-bit shift register 214 is connected to a second input of the tenth "and" gate 208 in the advance line of the registers 98, 100. The (0) output of the $2^0$ stage of the register 214 is connected to one input of an eleventh "and" gate 216, the output of which is inverted, delayed by a device 218 and applied to a ninth one-shot 220. The output of the one-shot 220 triggers a forward-reverse flip-flop 222. The "skip-out" signal from the character recognition apparatus is applied to the reset input terminal of this flip-flop 222. It is the function of this flip-flop to provide output levels for controlling the direction of rotation of the digital stepping motor 114. The (1) and (0) outputs of this flip-flop 222 are applied to the motor control unit 112 for this purpose. The motor 114 rotates in a direction to move the carriage 44 and transducer 46 in the forward direction when the flip-flop 222 is in the set state and when pulses are supplied to the motor control 112 from the output of the seventh one-shot 206. Each pulse causes the motor 114 to rotate a predetermined amount. The motor 114 rotates in the opposite direction in response to digital pulses when the flip-flop 222 is in the reset state. The (1) and (0) outputs of the flip-flop 222 also are applied to twelfth and thirteenth "and" gates 224 and 226, respectively. A second input to the thirteenth "and" gate 226 is the FWD output of the eighth "or" gate 186. The second input to the twelfth "and" gate 224 is the output of a tenth "or" gate 228, which receives inputs from the seventh "or" gate 184 and from a fourteenth "and" gate 230. The fourteenth "and" gate 230 receives a first input from the (1) output terminal of the line repeat flip-flop 130 (FIGURE 6a), a second input from the (0) output terminal of the servo-skew flip-flop 194 (FIGURE 6b) and a third input from the (0) output of an equality flip-flop 244 (FIGURE 6b) to be described.

The outputs of the twelfth and thirteenth "and" gates 224 and 226 are applied via "or" gate 236 to one input of each of the eleventh "and" gate 216 and a fifteenth "and" gate 232. The fifteenth "and" gate 232 also receives the (1) output of the $2^0$ stage of the shift register 214. The output of this "and" gate 232 is applied to the input of the ninth "and" gate 204 by way of an inverter 234.

It is desired that information sensed by either of the photocells 94a or 94a' in the transducer 46 (FIGURE 6b) cause two digit pulses to be supplied to the motor control 112; it is desired that information sensed by either of the photocells 94b or 94b' cause three digit pulses to be supplied to the motor control 112, and it is desired that information sensed by either of the photocells 94c or 94c' cause four digit pulses to be sent to the motor control 112. As described previously, the state or condition of the forward-reverse flip-flop 222 controls the direction in which the stepping motor 114 rotates in response to the aforementioned digital pulses. The digital motor 114 may not respond rapidly enough to two successive high frequency pulses each tending to rotate the motor in an opposite direction. It is desirable, therefore, that means be provided to prevent the second such pulse from being supplied to the motor control 112 until the motor 114 settles after the first pulse. The four-bit shift register 214 and related circuitry are provided for these purposes.

Consider first that the forward-reverse flip-flop 222 is reset. The (0) output thereof then is high, enabling one input of the thirteenth "and" gate 226 and supplying a high level on the reverse line to the motor control 112. Assume that all of the photocells 94a, 94b, 94c of the transducer 46 sense information, indicating that the transducer 46 must be moved in the reverse direction. The outputs of these photocells 94a, 94b, 94c set the three stages in the register 98. The output of the fourth "or" gate 174 goes high and enables the seventh "or" gate 184 by way of the fifth "and" gate 178. The output of this "or" gate 184 enables one input to the twelfth "and" gate 224 by way of the tenth "or" gate 228. The other input to the twelfth "and" gate 224 is low at this time because the forward-reverse flip-flop 222 is reset. The output of the seventh "or" gate 184 causes the output of the sixth "or" gate 182 to go high, enabling one input of the eighth "and" gate 194. Pulses at the rate of 200 pulses per second are applied to the other input of the eighth "and" gate 196. After a 109 microsecond delay and pulse shaping by the one-shots 200, 202, these pulses are applied to the motor control 112, the eighth one-shot 210 and the tenth "and" gate 208.

The four-bit shift register 214 stages all are in the reset state at this time and the (1) output of the $2^2$ stage thereof is low, disabling the tenth "and" gate 208. The first 200 cycle pulse applied at the input of the eighth "and" gate 196, therefore, does not pass through the tenth "and" gate 208 to the advance line 172 of the error staticizer registers 98, 100. The output of the eighth one-shot 210, however, sets all of the stages in the four-bit shift register 214. The 200 pulse per second output of the third one-shot 158 (FIGURE 3) is applied to the advance (A) terminal of this register 214. The second clock pulse applied at the eighth "and" gate 196 again triggers the motor control 112 by way of the seventh one-shot 206, and also is passed by the now-activated tenth "and" gate 208 to the advance terminals of the registers 98, 100. The information in the register 98 is shifted one position to the right, as viewed in FIGURE 6b. The third and fourth occurring 200 cycle pulses are passed by the eighth "and" gate 196 in the manner described above, and each pulse triggers the digital stepping motor control 112 by way of the seventh one-shot 206 and advances the shift register 98 by way of the tenth "and" gate 208. The register 98 stages then are all reset and the output of the sixth "or" gate 182 goes low, disabling the eighth "and" gate 196. The four-bit shift register 214 stages are all in the set state at this time, having been set by the output of the eighth one-shot 210. It is thus seen that two pulses are supplied to the motor control 112 when the $2^0$ stage in either register 98 or 100 is set. When the $2^1$ stage in either register 98 or 100 is set, these pulses are supplied to the motor control 112 and, when the $2^1$ stage in either register 98 or 100 is set, four pulses are supplied to the motor control 112.

Assume that the $2^0$ stage of the register 100 is set by the output of the photocell 94a' immediately after the register 98 is cleared, that is to say, while all of the stages in the four-bit register 214 are set. The fifth "or" gate 176 output enables the eighth "or" gate 186 by way of the sixth "and" gate 180. The output of the eighth "or" gate 186 enables one input of the eighth "and" gate 196 by way of the sixth "or" gate 182, and the 200 cycle pulses are passed to the input of the fifth one-shot 200. The FWD output of the eighth "or" gate 186 fully enables the thirteenth "and" gate 226 because the forward-reverse flip-flop 222 is in the reset state at this time. The output of the thirteenth "and" gate 226 goes high and enables the eleventh "or" gate 236. The high output of this "or" gate 236 enables one input of each of the eleventh and fifteenth "and" gates 216 and 232. The other input to the eleventh "and" gate 216, however, is low because the $2^0$ stage of the four-bit register 214 is set. Accordingly, no signal is passed by the eleventh "and" gate 216 at this time to trigger the forward-reverse flip-flop 222 to the set state. The (1) output of the $2^0$ stage of the four-bit register 214 activates the fifteenth "and" gate 232. The high output of this gate 232 is inverted by the inverter 234 and inhibits the ninth "and" gate 204. Therefore, no pulses are supplied to the motor control 112 or to the advance terminal of the input register 100.

After four 200 cycle pulses are applied to the advance (A) terminal of the four-bit register 214, all stages in this register are reset. The (0) output of the $2^0$ stage goes high and enables the eleventh "and" gate 216, the output of which triggers the forward-reverse flip-flop 222 to the set state after a short delay. The eleventh "or" gate 236 at the output of the flip-flop 222 then is disabled. The (1) output of the $2^0$ stage of the register 214 goes low when this stage is reset, disabling the fifteenth "and" gate 232 and enabling the ninth "and" gate 204. The fourth 200 cycle pulse, which causes the $2^0$ stage of the register 214 to reset, also is applied to the eighth "and" gate 196 and, after a 109 microsecond delay, triggers the sixth one-shot 202. The output of this one-shot 202 occurs after the forward-reverse flip-flop 222 is set becasue the 109 microsecond delay of the fifth one-shot 200 is greater than the delay of the device 218 in the trigger input circuit of the forward-reverse flip-flop 222. The output of the sixth one-shot 202 is passed by the now-activated ninth "and" gate 204 to trigger the seventh one-shot 206. The output of the one-shot 206 triggers the motor control 112, and also is applied to the tenth "and" gate 208. No advance pulse is applied to the register 100, however, because the tenth "and" gate 208 is disabled by the low output at the (1) terminal of the $2^2$ stage in the four-bit register 214. The output of the eighth one-shot 210 then sets all of the stages in the register 214.

The next occurring 200 cycle pulse is passed by the eighth "and" gate 196. The delayed output of the seventh one-shot 206 triggers the motor control 112, and also passes through the now-activated tenth "and" gate 208 to advance the information in the error staticizer register 100. The register 100 stages then are all in the reset state and the output of the sixth "or" gate 182 goes low, disabling the eighth "and" gate 196. It is thus seen that pulses to the motor control 112 tending to rotate the digital stepping motor 114 in opposite directions are prevented from occurring closer together timewise than 20 milliseconds, a period corresponding to four consecutive 200 cycle pulses. This interval of time is sufficient to allow the digital stepping motor 114 to stabilize after being rotated in one direction and before being next rotated in the opposite direction. It is also seen that two pulses are supplied to the motor control 112 when the $2^0$ stage of the register 100 (or register 98) is set.

The pulse output of the eighth one-shot 210 is applied to one input of a sixteenth "and" gate 240 (FIGURE 6b) in one-to-one correspondence with the pulses applied to the motor control 112. The "start" pulse is applied to the other input of this "and" gate 240 by way of a tenth one-shot 242. The output of the sixteenth "and" gate 240 is applied: (1) to the set input terminal of an equality flip-flop 244; (2) to the reset terminal of an $X>Y$ flip-flop 246; (3) to one input of each of a seventeenth "and" gate 248 and an eighteenth "and" gate 250, and; (4) to a delay device 252 (FIGURE 6d).

FIGURE 6d is a block diagram of the counting means 110 of FIGURE 4 and comprises a pair of counters 258, 260, the outputs of which are applied to a comparator 256. One example of a suitable comparator 256 for practicing the invention is illustrated in FIGURE 9, to be described. One counter is provided for counting those pulses fed to the motor control 112 which tend to rotate the stepping motor 114 in a first direction. The second counter is provided for counting those pulses fed to the motor control 112 which tend to rotate the stepping motor 114 in the opposite direction. It will be apparent from a description of FIGURE 6d that a single bidirectional counter also could be used for this purpose.

The seventeenth "and" gate 248 has a second input connected to the output of the seventh "or" gate 184 (FIGURE 6c). This input is high whenever the register 98 stores information, that is to say, whenever it is desired to move the transducer 46 in the reverse, or left direction, as viewed in FIGURE 6b. The output of the seventeenth "and" gate 248 is connected to the trigger (T) input terminal of the first or $2^0$ stage in the counter 258, referred to in FIGURE 6d as the X counter. A similar Y counter 260 has the trigger (T) input terminal of its $2^0$ stage connected to the output of the eighteenth "and" gate 250. The counters 258 and 260 are otherwise identical and a description of the X counter 258 will suffice for descriptive purposes. The X counter 258 comprises a plurality of bistable trigger circuits (four illustrated by way of example), each having its (0) output terminal connected to the trigger (T) input terminal of the stage of next higher order. Both of the (1) and (0) output terminals of each of the stages in the counter 258 are connected to the comparator 256.

The comparator 256 has two output lines, labelled "$X=Y$" and "$X>Y$." The output on the $X=Y$ line goes high only when both of the counters 258 and 260 store the same number. The output of the $X>Y$ line goes high only when the number stored in the X counter is greater than the number stored in the Y counter 260. The $X>Y$ output line 262 is connected to the set (S) terminal of the $X>Y$ flip-flop 246 (FIGURE 6b). The $X=Y$ output and the "start" pulse are applied to separate inputs of a twelfth "or" gate 264, the output of which is delayed by a device 266 and applied to the reset terminals of all of the stages in the counters 258 and 260, and over a line 268 to the reset (R) terminal of the equality flip-flop 244. The counters 258 and 260 are reset whenever the numbers stored in these counters are equal or in response to the "start" pulse, preceding the reading of a row of characters.

The (0) output of the equality flip-flop 244 is connected to one input of the fourteenth "and" gate 230 (FIGURE 6c) for reasons which will be described hereinafter. The (1) output terminal of this flip-flop 244 is connected to one input of each of a pair of "and" gates 272, 274. A second input to each of these "and" gates 272, 274 is the output of a twenty-first "and" gate 276. The (1) and (0) outputs of the $X>Y$ flip-flop 246 are applied to the third inputs, respectively, of the "and" gates 272, 274. A twenty-second "and" gate 278 receives the following inputs: (1) line repeat level; (2) 750 cycle level, and; (3) 200 cycle level, all from the timing unit of FIGURE 6a. The error level output of the line repeat flip-flop 130 (FIGURE 6a) is applied to one input of a twenty-third "and" gate 282, the other input of which is connected to the output of the tenth one-shot 242. The output of this "and" gate 282 is applied to one input of a thirteenth "or" gate 280, the other input of which is the "end line" level at the (0) output of the servo-skew flip-flop 194. The outputs of the twenty-second "and" gate 278 and the thirteenth "or" gate 280 are applied to different inputs of the twenty-first "and" gate 276.

The output of the twenty-second "and" gate 278 is connected to one input of a twenty-fourth "and" gate 286. The (0) output of the line repeat flip-flop 130 (FIGURE 6a) is delayed in a device 284 and applied to a second input of the twenty-fourth "and" gate 286. The output of this "and" gate, when activated, enables each of the "and" gates 168 in the input lines to the error staticizer registers 98, 100. The three level inputs to the twenty-second "and" gate 278 all are high except during a carriage return operation. The line repeat flip-flop 130 is reset except during a line repeat operation. Accordingly, the inputs to the registers 98, 100 are enabled by the output of the twenty-fourth "and" gate 286 except during a carriage return operation, or shortly after the receipt of an error signal from the character recognition apparatus.

OPERATION OF THE POSITION CONTROL APPARATUS

Operation of the position control apparatus of FIGURE 6 may best be understood in connection with the timing diagram of FIGURE 7 and the timing disk of FIGURE 3. The "drum trigger" pulse (row a, FIGURE 7) is derived from the photo-responsive device 72b when the aperture 90 in circle b of the timing disk 68 passes in front of the light source 70. The "drum trigger" signal is delayed for approximately 1 millisecond by the delay device 192 (FIGURE 6b) to provide the "start" pulse (row b). The "start" pulse sets the servo-skew flip-flop 194. The servo level (row g) at the (1) output of the flip-flop 194 then goes high and the "end line" level (row h) at the (0) output goes low.

The programmed pulse output of the photo-responsive device 72e is illustrated on row d. These pulses occur at a rate of approximately 200 pulses per second following the "start" pulse and increase in frequency to a rate of 750 pulses per second. Approximately 67 pulses are generated at the latter frequency, after which the pulses decrease in frequency. It should be noted that the 95 pulses occur during the interval following a "start" pulse and before the next occurring "drum trigger" pulse.

The 200 pulse per second output of the photo-responsive device 73c is illustrated on row e. Only a portion of the pulses are shown. It will be understood, however, that 32 pulses, equally spaced timewise, are generated by the device 72e during each drum revolution. A portion of the 750 pulse per second output of the photo-responsive device 72d is shown on row f. These pulses are synchronized with the output of the photo-responsive device 72e when the output of the latter device 72e is 750 pulses per second.

The "end line" trigger signal (row c) is generated by the photo-responsive device 72a when the aperture 88 on circle a of the disk 68 passes in front of the light source 70. This signal resets the servo-skew flip-flop 194, whereupon the servo level (row g) drops to a low level and the "end line" level (row h) rises to a high level. The servo-skew flip-flop 194 remains in the reset state until the next "start" pulse.

*Servo operation.*—The servo operation is necessary whenever the center line of a row of information deviates from the standard helix. The motor 28 of FIGURE 1 operates through the differential 36 to move the carriage 44 at such a speed that the center of the transducer 46 follows the standard helix. Pulses are supplied to the digital stepping motor 114 to cause the stepping motor 114 to move the transducer 46 off the standard helix to track the row of characters.

Operation of the apparatus commences with the "drum trigger" pulse preceding the first character of the row. The "start" pulse follows one millisecond after the "drum trigger" signal. The "start" pulse sets the servo-skew flip-flop 194 to enable the outputs of the fifth and sixth "and" gates 178, 180. The "start" pulse also: (1) resets the error staticizer registers 98 and 100; (2) resets the four-bit shift register 214; (3) resets the counters 258 and 260, and; (4) blocks the inputs to the counters 258 and 260 during the first 20 milliseconds following the "start" pulse.

Clock pulses at the rate of 200 pulses per second are supplied by way of the eighth "and" gate 196 (FIGURE 6c) to the motor control 112 and to the counters 258 and 260 whenever information is sensed by any of the photocells 94a, 94b, 94c or 94a', 94b', 94c', as described previously. The number of pulses supplied to the motor control 112 is in proportion to the degree of displacement of the center line of the row of characters with respect to the center of the transducer 46. Each pulse causes the stepping motor 114 to rotate a predetermined amount. The outputs of the forward-reverse flip-flop 222 are supplied to the motor control 112 to control the direction of rotation of the stepping motor 114 in response to the control pulses. The difference between the numbers stored in the counters 258, 260 at any time after the first 20 milliseconds of a row, indicates the net amount by which the transducer 46 is displaced from the reference of that row. It is necessary to return the transducer 46 to the standard helix after a row is read so that the transducer 46 will be in position to read the first character of the next row. The latter operation is called "skew correction."

*Skew correction.*—Skew correction commences with the "end line" trigger pulse (see FIGURE 7). This pulse resets the servo-skew flip-flop 194 to remove the enabling levels from the fifth and sixth "and" gates 178 and 180 to prohibit further servoing. The (0) output of the servo-skew flip-flop 194 activates the thirteenth "or" gate 280. Both inputs to the twenty-first "and" gate 276 then are high and the output of this gate 276 enables one input of each of the nineteenth and twentieth "and" gates 272 and 274. The nineteenth "and" gate 272 is activated by the (1) outputs of the equality flip-flop 244 and the $X>Y$ flip-flop 246 whenever the number stored in the X counter 258 is greater than the number stored in the Y counter 260, indicating that the transducer 46 must be moved in the forward direction to center the transducer 46 with respect to the standard helix.

The output of the nineteenth "and" gate 272, designated "skew correct FWD," activates the eighth "or" gate 186 (FIGURE 6c). The output of the "or" gate 186 enables the eighth "and" gate 196, whereby pulses at the rate of 200 pulses per second are supplied to the motor control 112 and to the seventeenth and eighteenth "and" gates 248 and 250 at the inputs to the counters 258, 260. The output of eighth "or" gate 186 enables a second input to the eighteenth "and" gate 250, whereby the pulses supplied to the motor control 112 are counted in the Y counter 260. The number of pulses supplied to the motor control 112 is equal to the difference between the numbers stored in the counters 258 and 260. The $X=Y$ output line 268 of the comparator 256 goes high when the stored counts are equal and resets the counters 258 and 260 and the equality flip-flop 244. The skew correct operation terminates when the equality flip-flop 244 is reset. The transducer 46 then is centered with respect to the standard helix.

The twentieth "and" gate 274 is activated at the beginning of the skew correct operation whenever the number stored in the Y counter 260 is greater than the number stored in the X counter 258. This indicates that the transducer 46 must be moved in the reverse direction (to the left, as viewed in FIGURE 1). The operation described in the previous paragraph is followed for the skew correct reverse operation, except that the seventh "or" gate 184 is activated. The REV output of this "or" gate 184 enables one input of the seventeenth "and" gate 248, whereby pulses supplied to the motor control 112 trigger the X counter 258. The operation terminates when the numbers stored in the counters 258 and 260 are equal, as described above.

It has been found that enhanced operation results by not counting the servo pulses applied to the motor control 112 during the sensing of the first few characters of each row. Skew correction is referenced essentially to the first character of the first row if all of the servo pulses are counted. If this character is not centrally located with respect to the transducer 46, or if the first character of the first row is vertically mis-registered with respect to the other characters of that row, the first character of each succeeding row also will be "off-center" with respect to the transducer 46. Tolerances in the system may have the same effect. For this reason, it is preferable to servo on each entire row, but to omit counting the pulses applied to the motor control 112 during the reading of the first few characters of each row. This method of operation allows the servo apparatus to position the transducer 46 centrally during the reading of the first few characters and has the effect of establishing, as a reference for skew correction, a point near the beginning of the row being read. Cumulative errors are thereby eliminated. The counters 258, 260 are blocked during the first 20 milliseconds of each row by the inverted output of the tenth one-shot 242 to accomplish this objective.

*Line repeat operation.*—The character recognition apparatus supplies an error signal whenever an error is detected. This error may arise from several causes, for example, a distorted character which cannot be recognized, etc. The position control apparatus responds to the error signal by positioning the carriage 44 and transducer 46 to reread the row of characters in which the error occurred. Positioning of the transducer 46 takes place during the drum 20 revolution following the row in which the error occurred. For example, assume that the error occurs in the first row. The transducer is in position to read the first character of the second row at the end of the first drum revolution. During the second revolution, the motor 28 tends to move the transducer 46 so that the transducer is in position to read the first character of the third row after the second drum revolution. It is necessary, therefore, that the position control apparatus operate to move the transducer 46 in the reverse direction equal to twice the pitch of the standard helix. In the system described herein, this is accomplished by supplying 95 pulses to the digital stepping motor. It is desired that no servoing take place after the error signal is generated, unless the error is detected during the reading of the first few characters of a row. It is also necessary that skew correction be carried out after the error signal is generated in order to return the transducer 46 to the standard helix before commencement of the line repeat operation.

The line repeat operation is as follows. The error signal sets the line repeat flip-flop 130 (FIGURE 6a). The (0) output of the line repeat flip-flop 130 goes low and, after a delay in the delay device 284, disables the "and" gates at the input of the register 98, 100 to inhibit further servoing. The delay 284 is provided so that servoing is not inhibited on the first few characters of a line if the error occurs on the first character. The (1) output of this flip-flop 130 enables one input to the first "and" gate 132 and one input of the fourteenth "and" gate 230 (FIGURE 6c). The (1) output activates the twenty-third "and" gate 282 and starts the skew correct operation, assuming the error is detected more than twenty milliseconds following the "start" pulse. If the error signal occurs during the first twenty milliseconds following the "start" signal, skew correction is delayed by the output of the tenth one-shot 242. The equality flip-flop 244 is reset at the end of the skew correct operation. The (0) output of the flip-flop 244 then enables a second input of the fourteenth "and" gate 230. This "and" gate 230 is activated at the end of a row of characters by the end line level, and its output is fed through the tenth "or" gate 228 to the twelfth "and" gate 224. If the forward-reverse flip-flop 222 is set at this time, the twelfth "and" gate is activated and the output thereof is fed back to the trigger input of the forward-reverse flip-flop 222 to reset the flip-flop. The REV output at the (0) terminal is fed to the motor control 112 to cause the digital pulses supplied to the motor control 112 from the seventh one-shot 206 to rotate the digital stepping motor in the reverse direction.

The "start" pulse is generated at the beginning of the next row of information and activates the first "and" gate 132. The output of this "and" gate 132 sets the program flip-flop 136 by way of the first "or" gate 134. The (1) output of this flip-flop 136 activates the second "and" gate 142, whereby the programmed output (95 pulses) of the photo-responsive device 72e is passed to the fourth one-shot 162. The output of this one-shot 162 is supplied as a clock input to the eighth "and" gate 196. The (0) output of the program flip-flop 136 is designated "line repeat level." This level goes low when the flip-flop 136 is set, and is inverted and applied to one input of the ninth "or" gate 190, the output of which activates the eighth "and" gate 196. The 95 pulses from the programmed source are supplied to the motor control 112 by the output of the seventh one-shot 206. The counters 258 and 260 are not triggered at this time because both the REV and FWD levels are low. The next drum trigger signal resets the program flip-flop 136 to deactivate the second "and" gate 142. The (1) output of the flip-flop 136 goes low and triggers the first one-shot 140 to reset the line repeat flip-flop 130. The 95 pulses supplied to the motor control 112 cause the digital stepping motor 114 to move the transducer 46 in the reverse direction a distance equal to twice the pitch of the standard helix.

*First line finding.*—The transducer 46 moves from the "home" position in response to the drive supplied by the motor 28, and the center of the transducer 46 traces out a standard helix. The first character of the first row on the document 40 will not be properly positioned with respect to this standard helix if the document 40 either is not properly positioned on the drum 20 or if the first row of characters is not properly located on the document. In either case, the first character of the first row may not be entirely within the reading range of the transducer 46. It is necessary in this case to move the transducer 46 into reading position. This may be accomplished by one or more line repeat operations. Servo operation takes place on the first few characters of a line even if the first character is in error, for reasons described above. This servo operation moves the transducer 46 so that the first character falls within the central, desired reading range of the transducer 46. No skew correction takes place in response to the servo operation on the first few characters because the inputs to the counters 258, 260 are inhibited for 20 milliseconds following a "start" pulse. The transducer 46 may be properly located with respect to the first character in a single line repeat operation if the character falls only slightly outside the reading range of the transducer. Several line repeat operations may be required if the first character is greatly displaced from the standard helix. The standard helix in this sense is the helix traced out by the center of the transducer 46 as it moved from the "home" position.

The above-described operation for first line finding operates as described when the spacing between the lines of characters is not too great with respect to the distance spanned by the photocells, that is to say, with respect to the width of the path traced by the photocells. If the spacing is too great, it is possible that the transducer 46 may fall between the first and second rows of characters without sensing characters in either row. This limitation may be overcome, if present, by moving the transducer 46 at a reduced speed from the "home" position to the first row of characters by supplying pulses to the digital stepping motor 114 at this time to retard the speed of the transducer 46 and carriage 44.

*Carriage return operation.*—The carriage return operation operates to move the carriage 44 and transducer 46 to the "home" position after the last row of characters on the document 40 is read. The character recognition apparatus senses the completion of the last row of characters, for example, by detecting the absence of information following a "start" pulse. The character recognition apparatus then supplies a "skip-out" pulse in time coincidence with the next "start" pulse. The mechanical drive from the motor 28 is disconnected from the differential 36 during the carriage return by de-energizing the clutch and energizing the brake in the clutch-brake assembly 34 (FIGURE 1) in a manner to be described hereinafter.

The skip-out pulse is applied directly to the reset terminal of the forward-reverse flip-flop 222 to reset this flip-flop. The skip-out pulse also sets the program flip-flop 136 by way of the first "or" gate 134. The (1) output of this flip-flop 136 activates the second "and" gate 142 to pass a portion of the programmed pulses to the fourth one-shot 162. The output of this one-shot 162 is supplied as a clock input to the eighth "and" gate 196 (FIGURE 6c). The (0) output of the program flip-flop 136 goes low and activates the eighth "and" gate 196 by way of the sixth "or" gate 162 and the ninth "or" gate 190, whereby the programmed output of the fourth one-shot 162 is fed to the motor control 112. The skip-out pulse is delayed and applied to the second one-shot 146. The output of this one-shot 146 resets the program flip-flop 136 to disable the second "and" gate 142, and sets the 750 cycle flip-flop 148. The (1) output of this flip-flop 148 activates the fourth "and" gate 154, and pulses at the rate of 750 per second are passed by the fourth "and" gate 154 to the fourth one-shot 162. These pulses are passed by the eighth "and" gate 196 (FIGURE 6c) to the seventh one-shot 206 and then to the motor control 112. The (0) output of this flip-flop 148 enables the eighth "and" gate 196 by way of the sixth "or" gate 182 and the ninth "or" gate 190. The delay 144 is selected so that the pulse input to the second "and" gate 142 is at the rate of 750 pulses per second when the 750 cycle flip-flop 148 is set.

Switch SW1 is positioned to be energized, as described previously, when the carriage 44 nears the "home" position. The 750 cycle flip-flop 148 is reset when the switch SW1 is energized. The (0) output of this flip-flop 148 triggers the 200 cycle flip-flop 166 when the flip-flop 148 is reset. The 200 cycle level output of the flip-flop 166 activates the eighth "and" gate 196 by way of the sixth "or" gate 182 and the ninth "or" gate 190. The program flip-flop 136 and the 750 cycle flip-flop 148 are reset at this time and their (0) outputs enable the third "and" gate 152. This "and" gate 152 passes the 200 pulse per second output of the third one-shot 158 to the fourth one-shot 162. The output of the fourth one-shot 162 is passed by the enabled eighth "and" gate 196 and related circuits to the motor control 112. Switch SW2 is energized when the carriage reaches the "home" position. Energizing this switch resets the 200 cycle flip-flip and removes the enabling level from the eighth "and" gate 196. No further pulses are supplied to the motor control 112. No servoing takes place during a carriage return operation because the "and" gate 168 at the inputs to the staticizers 98, 100 are disabled by the output of the twenty-fourth "and" gate 286. At least one input to the twenty-second "and" gate 278 is low at all times during carriage return.

A circuit for controlling the operation of the clutch-brake assembly 34 (FIGURE 1) is illustrated in FIGURE 8. The circuit comprises a flip-flop 300 which is reset by the skip-out signal from the character recognition apparatus. The flip-flop 300 is set by the first "start" signal after the switch SW2 is energized. The "start" signal resets the flip-flop 300 by way of an "and" gate 302. The (1) output of the flip-flop 300 energizes the clutch in the clutch-brake assembly 34. The clutch is preferably a magnetic clutch. The (0) output of the flip-flop 300 energizes the brake in the assembly 34. The clutch is energized at all times, except during the carriage return operation, to supply drive to the carriage 44 through the differential 36. The brake is energized only during the carriage return operation. The brake is required so that the digital stepping motor 114 can drive the carriage 44 without moving the clutch controlled shaft.

COMPARATOR

FIGURE 9 is a block diagram of a comparator circuit suitable for use as the comparator 256 (FIGURE 6d). The comparator comprises four cascaded "and" gates 310, 320, 322, 324 connected between the output of the delay 252 and the output line, designated $X=Y$.

Each of these "and" gates 310, 320, 322, 324 receives a first input from the previous one of the cascaded "and" gate, and second and third inputs from a different pair of "or" gates. The "and" gate 310, for example, receives the outputs of "or" gates 326 and 328. The "and" gate 320 receives the outputs of "or" gates 330 and 332. The "and" gate 322 receives the outputs of a pair of "or" gates 334 and 336, and the "and" gate 324 receives the outputs of a pair of "or" gates 338 and 340. Each "or" gate of a pair is connected to the output terminals of opposite sense of the same order stage in the X and Y counters 258, 260. For example, the "or" gate 326 is connected to the (1) output terminal of the $2^3$ stage in the X counter 258. The other input is connected to the (0) output of the $2^3$ stage in the Y counter 260. The inputs to the other "or" gate of the pair, for example "or" gate 328, are connected to the remaining output terminals of the same stages of the counters. It is important that the "or" gates 326, 328 receive their inputs from the $2^3$ stages, or stages of highest order in the counters. The "or" gates 330, 332 feeding the next "and" gate 320 in the cascaded chain receive their inputs from the counter stages of next to highest order, etc.

The output of the delay 252 is applied as one input to an "and" gate 346. The outputs of the other "and" gates 310, 320 and 322, are connected to one input of each of a plurality of "and" gates 348, 350 and 352, respectively. These "and" gates 346 . . . 352 also are connected to receive the outputs of the counter stages indicated. The output of each of the "and" gates 346 . . . 352 is connected to an "or" gate 356, the output of which is labelled $X > Y$.

The operation of the comparator will now be described. Each of the "or" gates 326 . . . 340 is activated whenever $X = Y$. Consider, for example, the "or" gates 326 and 328, which receive inputs from different output terminals of the $2^3$ stages of the X counter 258 and the Y counter 260. If $X = Y$, then either the (1) or the (0) outputs of both these stages are high and both of the "or" gates 326 and 328 receive an activating input level. The "and" gate 310 is activated by the output of the delay 252. The other "or" gates also are activated when $X = Y$, and the output of the delay 252 passes through the chain of "and" gates 310 . . . 324 to the output line, designated $X = Y$. All of the other "and" gates 346 . . . 352 are deactivated at this time because the X and Y inputs to each of these "and" gates have the opposite sense from one another.

Assume now that $X > Y$. At least one of the "or" gates 326 . . . 340 is deactivated when this condition exists. By way of example, if the $X2^2$ stage stores a binary "one" and the $Y2^2$ stage stores a binary "zero," the "or" gate 330 receives two energizing input signals while the other "or" gate 332 of the pair receives no energizing input signals. Accordingly, the associated "and" gate 320 is deactivated and the output of the delay 252 is blocked from reaching the $X = Y$ output line. The "and" gate 348, however, is activated, assuming that $X2^3$ (1) equals $Y2^3$ (1), and the output of the delay 252 passes through "and" gates 310 and 348 to energize the "or" gate 356. The output of this "or" gate 356 then is high, indicating that $X > Y$.

If $Y > X$, the output of the delay 252 is blocked from reaching the $X = Y$ output line, for reasons described in the previous paragraph. None of the "and" gates 346, 352 is energized and no enabling signal is passed to the "or" gate 356. The voltages on both of the output lines then are low, indicating that $Y > X$.

FLYING SPOT SCANNER SYSTEM

Although the position control apparatus of the invention has particular application in a system of the type illustrated in FIGURE 1 for controlling the position of the reader transducer, the invention is not limited to use in such a system. The position control apparatus could, for example, control the movement of a document transport, or the scan of a flying spot scanner. An example of the latter application is illustrated in FIGURE 10. Also, in a particular application, the position control apparatus need not perform all of the five functions discussed previously.

It has been suggested that the document transport in a reader system comprise a rotating drum 400 which moves parallel to its axis of rotation as the drum is rotated. The drum 400 carries a document 402 which, as described previously, is skewed relative to the drum 400 axis so that the center lines of the rows of characters lie on a helix whose pitch is the distance between adjacent centerlines. The speed of movement of the drum 400 parallel to its axis is controlled mechanically so that the projection on the drum 400 of a point in space always lies on the helix.

A flying spot scanned 404 is provided for scanning the information on the document 402 as the drum 400 rotates. A recurring sawtooth voltage 406 from a sweep circuit 408 is impressed on the vertical deflection plates 410 of the scanner 404 by way of a deflection circuit 412, whereby the flying spot scanner 404 output is a spot of light which traces along a vertical line, as viewed in the drawing. The height of this line projected on the document 402 is the width of the path traced out, or scanned, on the document 402 as the drum 400 rotates. The sawtooth 406 amplitude is adjusted so that the width of the path is greater in extent than the height of the characters to be read, for reasons explained in the previous example.

In the event that the document 402 is not properly skewed on the drum 400, the centerlines of the rows of characters deviate from the standard helix, and servo operation of the vertical scan is necessary to track the rows of characters. Skew correction is necessary at the end of a row of characters to properly position the vertical scan relative to the standard helix so that the first character of the next row may be scanned. First line finding and line repeat also may be required.

The light output of the flying spot scanner 404 is directed to the document 402 through an imaging lens 414 interposed between the face of the scanner 404 and the document 402. The light reflected from the document 402 is concentrated by a condenser lens 416 and directed to a photo pickup device 418, which may be, for example, a phototube. The phototube 418 output is supplied to a multistage shift register 420. Information in the shift register 420 may be shifted by timing signals of synchronizing frequency from a timing unit 424.

The shift register 420 may take the place of the photocells 94 and the error staticizer registers 98, 100 of FIGURE 6b. That is to say, the outputs of all of the shift register 420 stages may be supplied to the character recognition apparatus 422. Outputs of the three stages at one end of the register 420 are supplied to the fourth "or" gate 174 (FIGURE 6b) and the outputs of the three stages at the other end of the register 420 are supplied to the fifth "or" gate 176. These "or" gates 174, 176 supply control levels to the control unit 428, which may be similar generally to the control unit 104 (FIGURE 3) described previously. Means (not shown) may be provided for enabling the shift register 420 outputs at the proper time in the scanning cycle, namely at the end of each vertical scan. An output from the sweep circuit 408 may be used for this purpose.

The pulse output of the control unit 428 is supplied to a bidirectional counter and to a counting means 432. The counting means 432 is similar to the counting means 110 of FIGURE 4. The bidirectional counter 430 also receives a control level or control levels directing the direction of counting of the control pulses. These control levels are generated, for example, by the forward-reverse flip-flop 222 (FIGURE 6c). Additional counting means 432 may be substituted for the bidirectional counter 430, provided means are included for continuously supplying a difference count.

The output of the bidirectional counter 430 is applied to a digital-to-analog converter 440, the output of which is an analog voltage proportional to the count stored in the bidirectional counter 430. This output is applied to the deflection circuit 414 for controlling the position of the vertical sweep on the face of the flying spot scanner 404. That is to say, the scan is moved up or down on the face of the scanner 404 depending upon whether the voltage output of the converter 440 is greater or less than a reference value.

Operation of the FIGURE 10 system will be understood from an understanding of the operation of the FIGURE 1 system described previously. The center of the flying spot scanner 404 scan normally falls on the standard helix. If the row of characters being scanned deviates from the standard helix, information is stored in one or more of the three stages at either end of the shift register 420. The control unit 428 then supplies control levels and pulses to the counting means 432 and to the bidirectional counter 430. The output of the latter counter 430 is converted to an analog voltage, and repositions the scan vertically in a direction to center the scan relative to the centerline of the row being read.

Skew correction takes place after the row of characters is scanned. The control unit 428 sends a number of control pulses to the counting means 432 and to the bidirectional counter 430, the number of pulses being equal to the difference in the counts stored in the counting means 432. These pulses step the bidirectional counter 430 in the direction to return the center of the scan to the standard helix.

During the line repeat operation, the timing unit 424 supplies a predetermined number of pulses to the bidirectional counter 430 to move the projection of the center of the scan on the document 402 a distance equal to twice the pitch of the standard helix. The center of the scan, of course, is moved toward the top of the document 402. The line repeat operation is used for first line finding, as described in connection with the system of FIGURE 1.

The carriage return operation, per se, is not necessary in the FIGURE 10 system for obvious reasons. It is only necessary to recenter the vertical scan to a reference after a document 402 is read. The carriage return operation may be used for this purpose. This operation terminates when the output of the digital-to-analog converter 440 reaches a reference value.

What is claimed is:

1. In apparatus for reading a row of information recorded on a storage medium, the combination comprising: means for scanning said row of information in a succession of substantially columnar scans successively disposed along said row; means responsive to the scanning of information lying witihn a predetermined distance of one end or the other end of a columnar scan for producing first and second control signals, respectively; separate means for counting all said first and second control signals, respectively, which occur during the scanning of a complete row of information; means responsive to said first and second control signals for providing relative movement between said medium and said scanning means in a direction to center said row relative to said scanning means; and means responsive to the outputs of said counting means, and operative after the entire said row of information is scanned, for supplying to said relative movement producing means a number of control signals equal to the difference in the counts stored in said separate counting means.

2. The combination claimed in claim 1 wherein said scanning means includes an optically aligned column of light responsive elements, and wherein said predetermined distance at one end and the other end are the portions of a scan corresponding, respectively, to certain ones of said elements located at opposite ends of said optically aligned column.

3. In apparatus for reading a row of information recorded on a storage medium, the combination comprising: means for scanning said row of information in a succession of substantially columnar scans successively disposed along said row; means responsive to the scanning of information lying within a predetermined distance of one end or the other end of a columnar scan for producing first and second control signals, respectively, in number determined by the position of the scanned information at said one end and said other end, respectively; means responsive to said first and second control signals for producing relative movement between said scanning means and said medium in one direction and an opposite direction, respectively, to center said row relative to said scan; separate means for producing a continuous count of said first and second control signals, respectively; and means responsive to the outputs of the counting means, and operative after a predetermined time following the start of a scanning operation, for supplying to said relative movement producing means control signals equal in number to the difference in the counts stored in said counting means.

4. In apparatus for reading information recorded on a storage medium, the combination comprising: means for successively scanning said medium along a path of uniform width and for producing signals in response to sensed information; means responsive to ones of said signals corresponding to information sensed within first and second opposite end regions of the width of said path for producing first and second control signals, respectively; first and second counters, respectively, for counting said first and second control signals; means responsive to said first and second control signals for producing relative movement between said scanning means and said medium in a direction toward said one end and said other end, respectively; means for generating a timing signal after a row of information is scanned; and means responsive to said timing signal and to a difference in the outputs of said counters for enabling said control signal producing means in the absence of said information signals.

5. In apparatus for reading information recorded on a storage medium, the combination comprising: means for normally scanning said medium successively along a given path of uniform width; means responsive to the scanning of information within first and second end limits of the width of said path for producing first and second control levels, respectively; a bistable element responsive to said first and second levels for assuming a first stable state and a second stable state, respectively; a source of clock pulses; means responsive to said clock pulses and enabled by either of said levels for producing control signals when either of said levels is present; means responsive to said control signals and the outputs of said bistable element for displacing the scan relative to said given path in a direction toward the one of said limits in which said last-mentioned informaton is sensed; counting means responsive to the outputs of said bistable element for counting said control signals; and means operative on command and responsive to a difference in the outputs of said counting means for enabling said control signal producing means in the absence of said first and second levels.

6. The combination claimed in claim 5 wherein said scan displacing means is a bidirectional, digital stepping motor mechanically coupled to one of said scanning means and said medium.

7. The combination claimed in claim 5 wherein said scanning means is a plurality of optically aligned light responsive elements.

8. The combination claimed in claim 7 wherein said scan displacing means is a bidirectional stepping motor mechanically coupled to said light responsive elements for moving said elements in a direction substantially normal to said given path.

9. In a reader system for a document having equally spaced rows of information recorded in parallel thereon, the combination of: a rotating drum including means for holding a document against the surface of said drum; a reader, constrained to move parallel to the axis of said drum, for sensing information along a line greater in extent than the height of a row and for producing signals in response to sensed information; means for normally feeding said document to said drum with the rows of information skewed at such an angle relative to said axis that the rows of information lie on a helix whose pitch is the spacing between center lines of adjacent said rows; first means for moving said reader parallel to said axis to follow said helix as said drum rotates; means responsive to ones of said signals representing information sensed within first and second opposite end regions of a said sensing line for producing first and second control levels, respectively; a source of clock signals; means responsive to said clock signals and to said first and second levels for producing control pulses for moving said reader in a first direction and a second, opposite direction, respectively; first and second counting means responsive to said control pulses and to said first and second control levels, respectively; means for generating a special signal after the last information in the row is sensed; and means responsive to said special signal, and to a difference in the counts stored in said first and second counting means for producing one of said first and second control levels.

10. The combination as claimed in claim 9 wherein said reader moving means comprises a bidirectional digital stepping motor mechanically coupled to said reader.

11. The combination claimed in claim 10 wherein said first moving means and said stepping motor are mechanically coupled to said reader through a differential.

12. In a reader system for a document having equally spaced rows of information recorded in parallel thereon, the combination comprising: a rotating drum including means for holding a document against the surface of said drum; a reader constrained to move parallel to the axis of said drum; means for normally feeding said document to said drum with the rows of informatoin skewed at such an angle relative to said axis that the rows of information lie on a helix whose pitch is the spacing between center lines of adjacent said rows; means for moving said reader in a first direction parallel to said axis to track said rows of information as said drum rotates; a source of timing signals; means for generating a special signal when it is desired to repeat the reading of a row of information; a motor mechanically coupled to said reader; and means responsive to said timing signals and said special signal for energizing said motor to move said reader a predetermined distance in a second direction opposite to said first direction.

13. In a system for reading a document having rows of information recorded in parallel thereon, the combination comprising: a rotating drum for transporting said document; a reader movable parallel to the axis of said drum for sensing information along a line greater in extent than the height of a row and for producing signals in response to sensed information; means for normally feeding said document to said drum with the rows of information skewed relative to said axis so that the centerlines of said rows lie on a helix having a pitch approximately equal to the distance between adjacent said centerlines; first means for moving said reader in a first direction parallel to said axis to follow said helix as said drum rotates; means responsive to ones of said signals representing information sensed within first and second opposite end regions of said sensing line for producing first and second control levels, respectively; a first source of clock pulses; means responsive to the output of said first source and to said first and second control levels for producing control pulses for moving said reader in said first direction and a second, opposite direction, respectively, parallel to said axis; first and second counting means responsive to said control pulses and to said first and second control leevls, respectively; means for generating a special signal after each row is read; means responsive to said special signal and to a difference in the outputs of said first and second counting means for producing one of said first and second control levels; means for generating an "error" signal when it is desired to reread a row; a second source of clock signals; and means responsive to asid "error" signal and to the output of said second source for producing a predetermined number of said control pulses for moving said reader in said second direction.

References Cited by the Examiner
UNITED STATES PATENTS

| | | | |
|---|---|---|---|
| 2,838,602 | 6/1958 | Sprick | 340—149 |
| 2,928,953 | 3/1960 | Bassler | 340—149 |
| 3,025,445 | 3/1962 | Welch | 318—444 |
| 3,081,444 | 3/1963 | Dietrick | 340—146.3 |
| 3,142,761 | 7/1964 | Rabinow | 340—146.3 |

MALCOLM A. MORRISON, *Primary Examiner.*

NEIL C. READ, *Examiner.*